US010657981B1

(12) United States Patent
Mansour et al.

(10) Patent No.: US 10,657,981 B1
(45) Date of Patent: May 19, 2020

(54) ACOUSTIC ECHO CANCELLATION WITH LOUDSPEAKER CANCELING BEAMFORMER

(71) Applicant: Amazon Technologies, Inc., Seattle, WA (US)

(72) Inventors: Mohamed Mansour, Cupertino, CA (US); Robert Ayrapetian, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 15/982,392

(22) Filed: May 17, 2018

Related U.S. Application Data

(60) Provisional application No. 62/619,289, filed on Jan. 19, 2018.

(51) Int. Cl.

| G10L 21/0208 | (2013.01) |
| H04R 1/08 | (2006.01) |
| H04M 9/08 | (2006.01) |
| G06F 17/10 | (2006.01) |
| G10L 15/22 | (2006.01) |
| H04R 1/28 | (2006.01) |
| G10L 15/14 | (2006.01) |
| G10L 15/08 | (2006.01) |

(52) U.S. Cl.
CPC .......... *G10L 21/0208* (2013.01); *G06F 17/10* (2013.01); *G10L 15/14* (2013.01); *G10L 15/22* (2013.01); *H04M 9/082* (2013.01); *H04R 1/083* (2013.01); *H04R 1/2873* (2013.01); *G10L 2015/088* (2013.01); *G10L 2021/02082* (2013.01)

(58) Field of Classification Search
USPC ...................................................... 704/1–504
See application file for complete search history.

(56) References Cited

U.S. PATENT DOCUMENTS

| 6,049,607 | A | * | 4/2000 | Marash | ................ | H04R 3/005 |
| | | | | | | 379/406.08 |
| 7,117,145 | B1 | * | 10/2006 | Venkatesh | ........... | G10L 21/0208 |
| | | | | | | 704/200 |
| 8,139,787 | B2 | * | 3/2012 | Haykin | .................. | G10L 21/02 |
| | | | | | | 381/94.1 |
| 8,160,273 | B2 | * | 4/2012 | Visser | ................. | G10L 21/0272 |
| | | | | | | 381/94.7 |

(Continued)

*Primary Examiner* — Marcus T Riley
(74) *Attorney, Agent, or Firm* — Pierce Atwood LLP

(57) ABSTRACT

Techniques for improving acoustic echo cancellation to attenuate an echo signal generated by a loudspeaker included in a device are described. A system may determine a loudspeaker canceling beam (LCB) (e.g., fixed beam directed to the loudspeaker) and may use the LCB to generate LCB audio data that corresponds to the echo signal. For example, based on a configuration of the loudspeaker relative to microphone(s) of the device, the system may perform simulation(s) to generate a plurality of filter coefficient values corresponding to the loudspeaker. By subtracting the LCB audio data during acoustic echo cancellation, the system may attenuate the echo signal even when there is distortion or nonlinearity or the like caused by the loudspeaker. In some examples, the system may perform acoustic echo cancellation using the LCB audio data and playback audio data.

20 Claims, 18 Drawing Sheets

(56) References Cited

U.S. PATENT DOCUMENTS

| | | | |
|---|---|---|---|
| 8,175,291 B2 * | 5/2012 | Chan | G10L 21/0208 381/94.7 |
| 8,321,214 B2 * | 11/2012 | Chan | H04R 3/005 704/225 |
| 8,538,749 B2 * | 9/2013 | Visser | G10L 21/02 704/200 |
| 8,620,672 B2 * | 12/2013 | Visser | H04R 3/005 704/500 |
| 8,831,936 B2 * | 9/2014 | Toman | G10L 21/0272 704/228 |
| 9,173,025 B2 * | 10/2015 | Dickins | H04R 3/002 |
| 9,432,769 B1 * | 8/2016 | Sundaram | H04R 3/005 |
| 9,653,060 B1 * | 5/2017 | Hilmes | H04M 9/082 |
| 9,659,555 B1 * | 5/2017 | Hilmes | G10L 21/0272 |
| 9,711,131 B2 * | 7/2017 | Christoph | H04S 7/301 |
| 9,747,920 B2 * | 8/2017 | Ayrapetian | G10L 21/0216 |
| 9,818,425 B1 * | 11/2017 | Ayrapetian | G10L 21/0224 |
| 9,966,059 B1 * | 5/2018 | Ayrapetian | G10K 11/346 |
| 9,966,086 B1 * | 5/2018 | Piersol | G10K 11/175 |
| 9,967,661 B1 * | 5/2018 | Hilmes | G10L 21/0272 |
| 10,475,471 B2 * | 11/2019 | Ebenezer | G10L 15/02 |
| 10,522,167 B1 * | 12/2019 | Ayrapetian | G10L 21/0264 |
| 2005/0094795 A1 * | 5/2005 | Rambo | H04M 9/08 379/202.01 |
| 2008/0208538 A1 * | 8/2008 | Visser | G10L 21/0272 702/190 |
| 2008/0312918 A1 * | 12/2008 | Kim | G10L 15/01 704/233 |
| 2009/0164212 A1 * | 6/2009 | Chan | G10L 21/0208 704/226 |
| 2009/0299742 A1 * | 12/2009 | Toman | G10L 21/0208 704/233 |
| 2009/0304203 A1 * | 12/2009 | Haykin | G10L 21/02 381/94.1 |
| 2010/0017205 A1 * | 1/2010 | Visser | G10L 19/00 704/225 |
| 2014/0126745 A1 * | 5/2014 | Dickins | H04R 3/002 381/94.3 |
| 2015/0149164 A1 * | 5/2015 | Oh | H04R 3/005 704/231 |
| 2017/0178662 A1 * | 6/2017 | Ayrapetian | G10L 21/0216 |
| 2018/0350379 A1 * | 12/2018 | Wung | G10L 21/0205 |

* cited by examiner

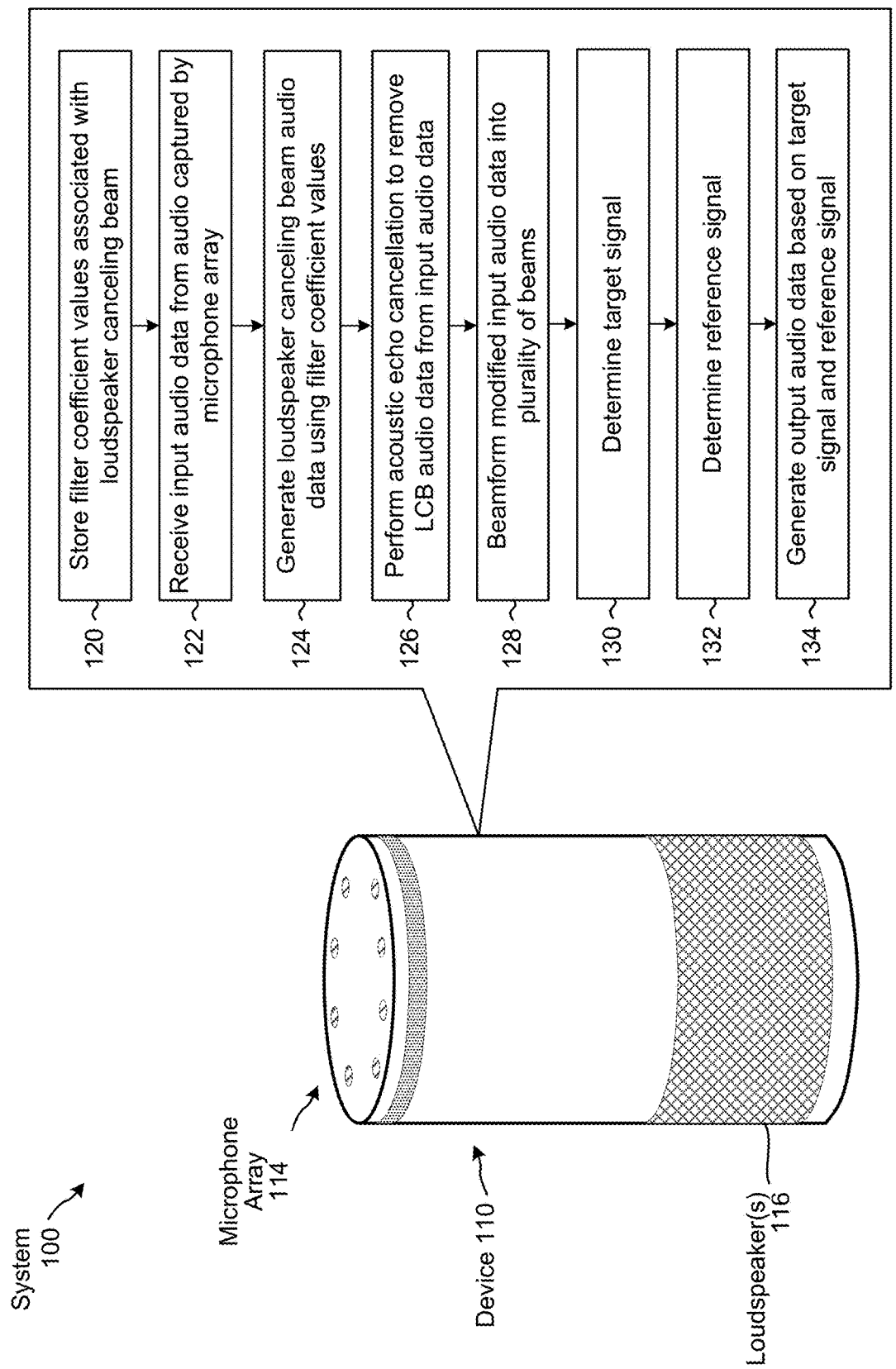

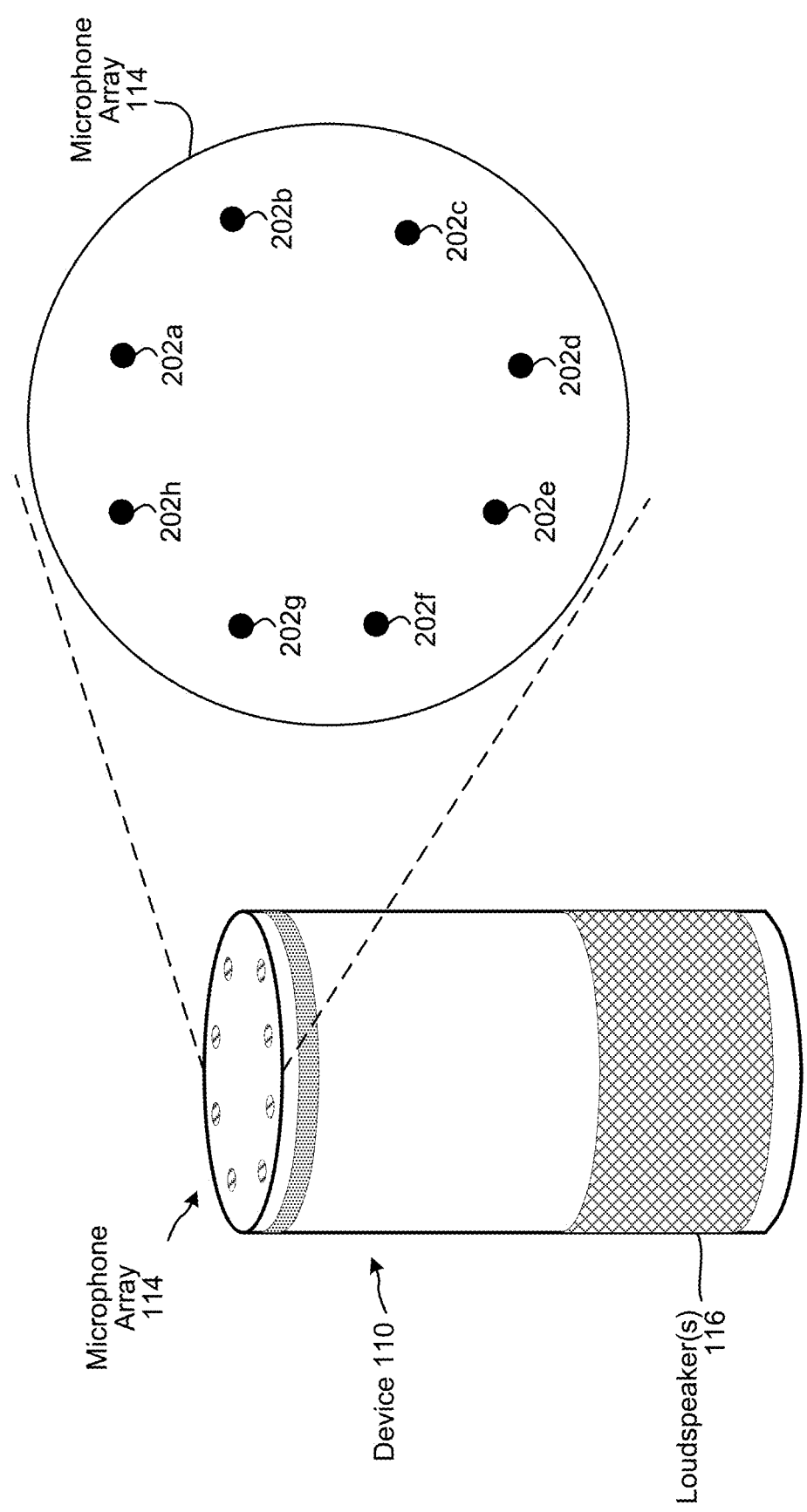

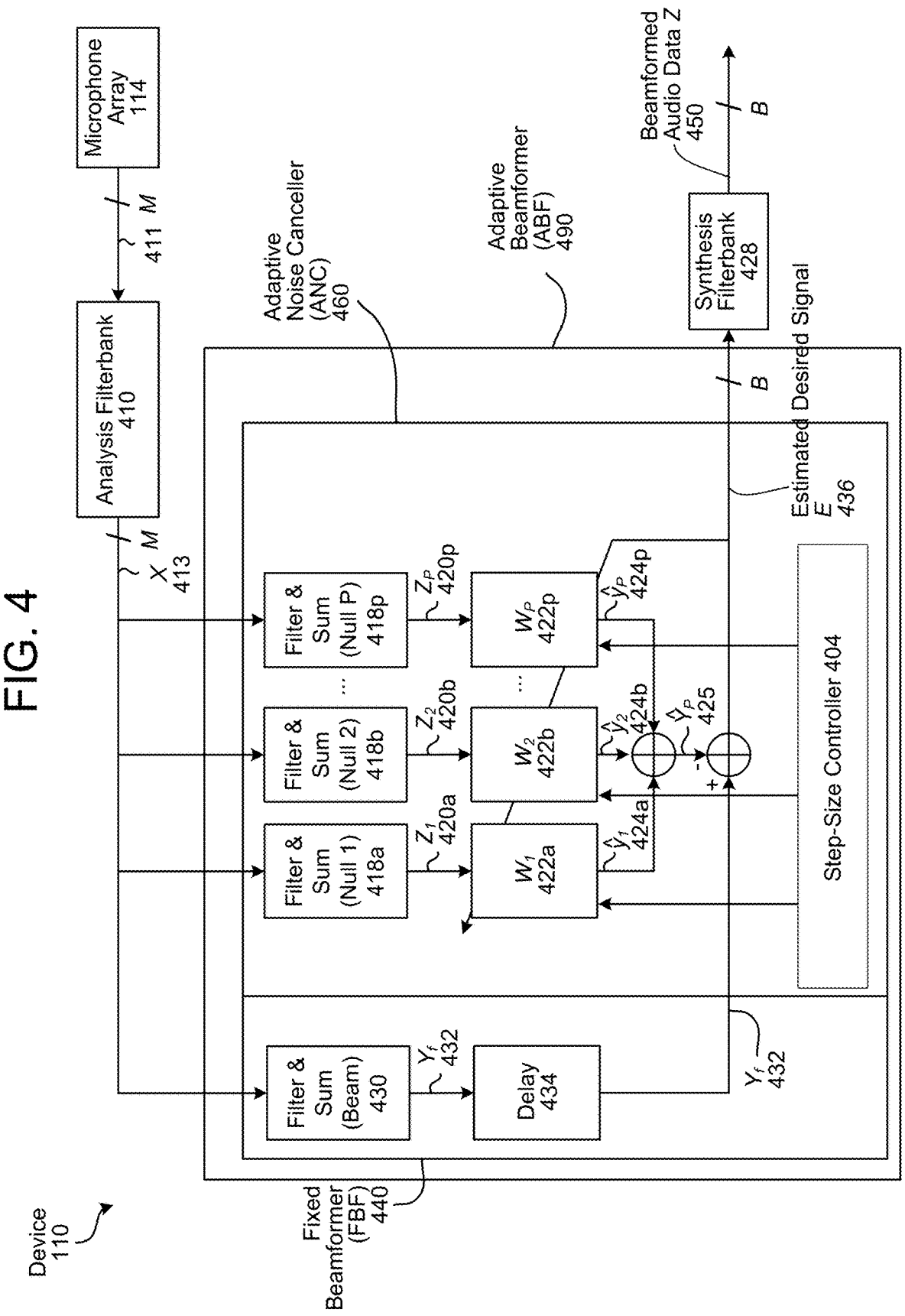

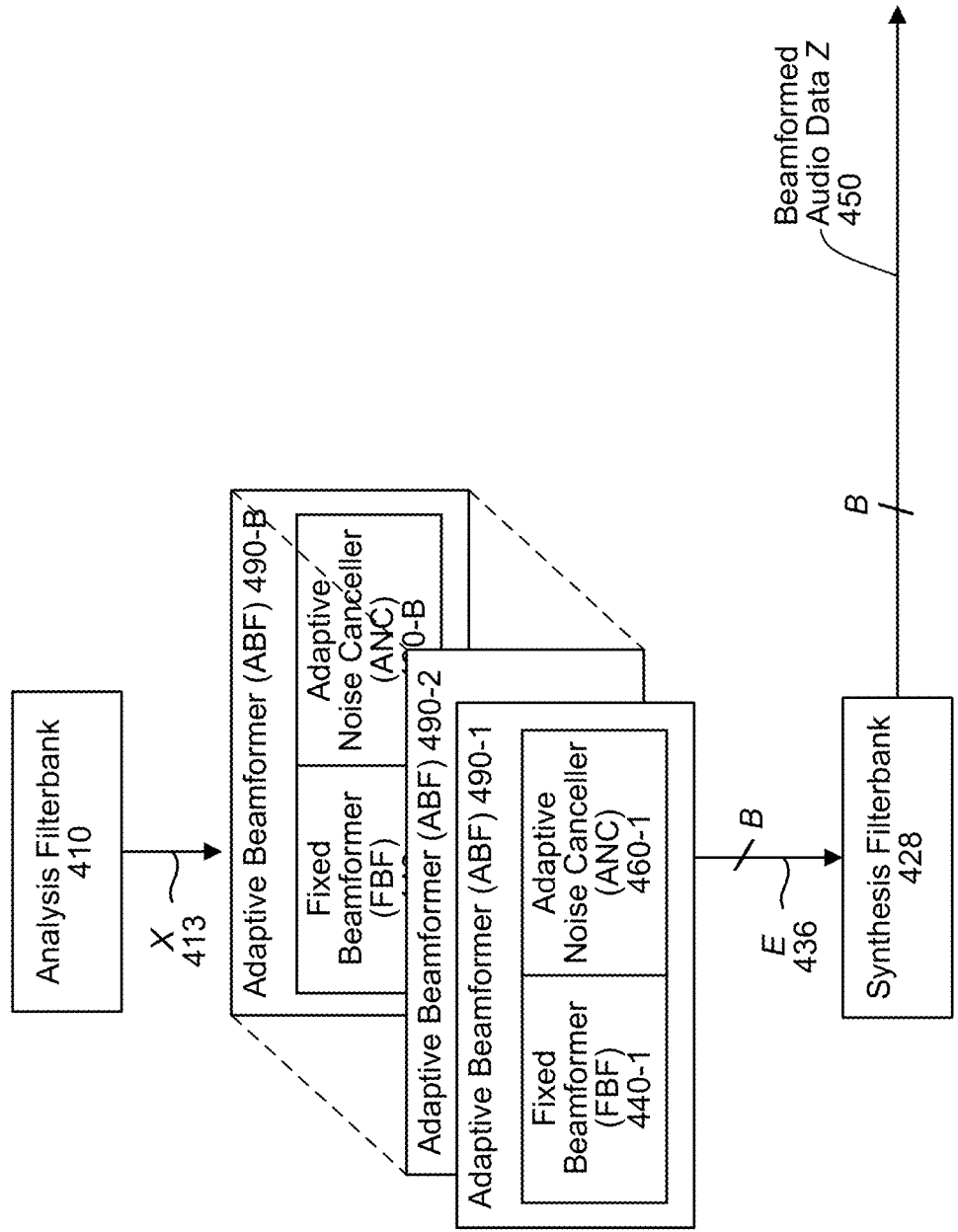

FIG. 7A
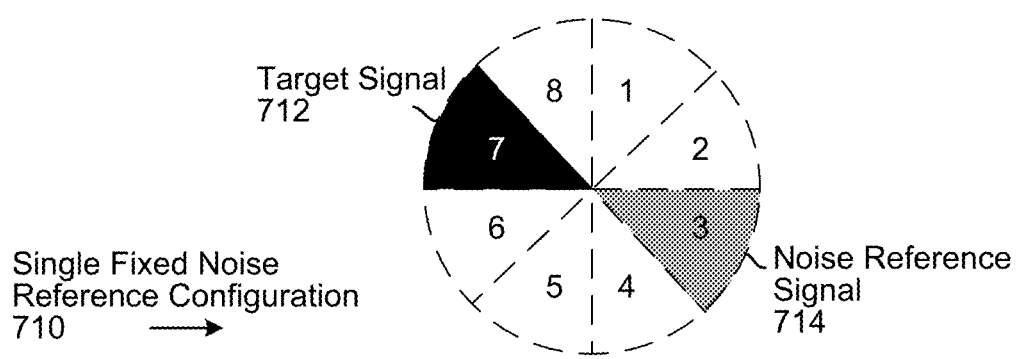
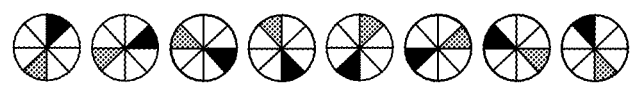
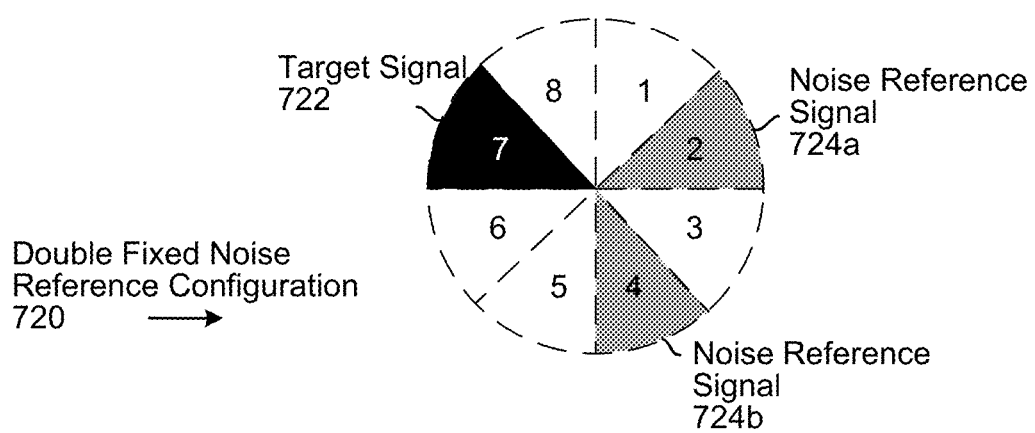
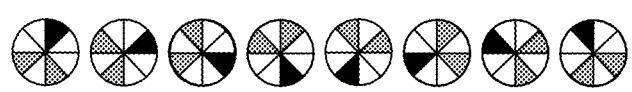

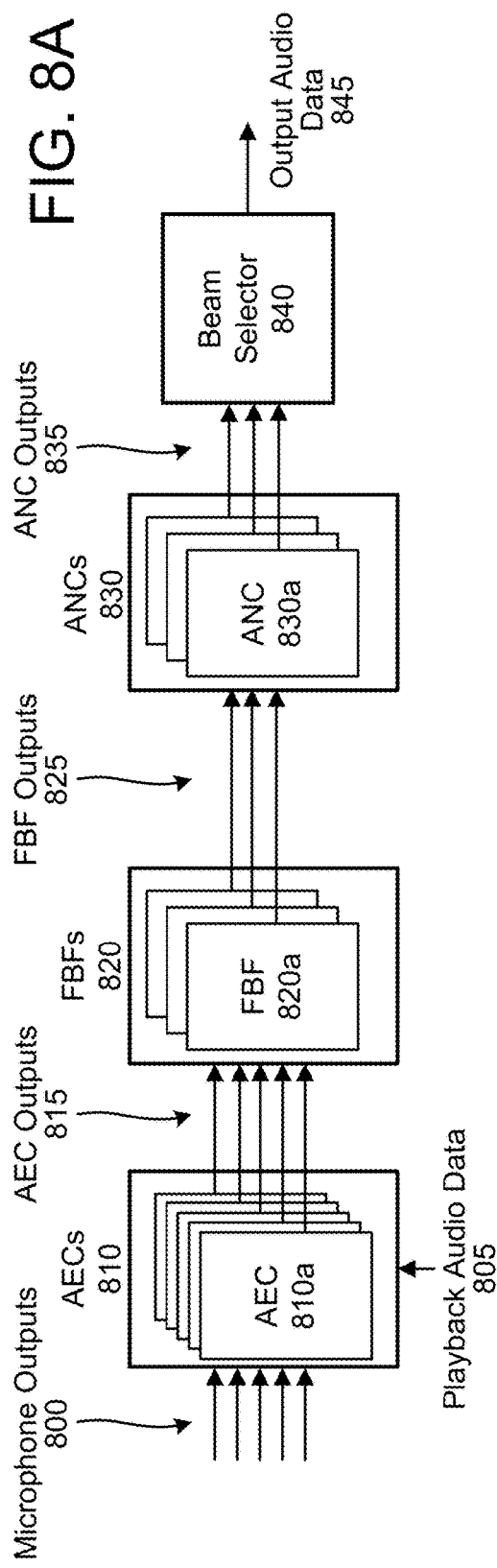
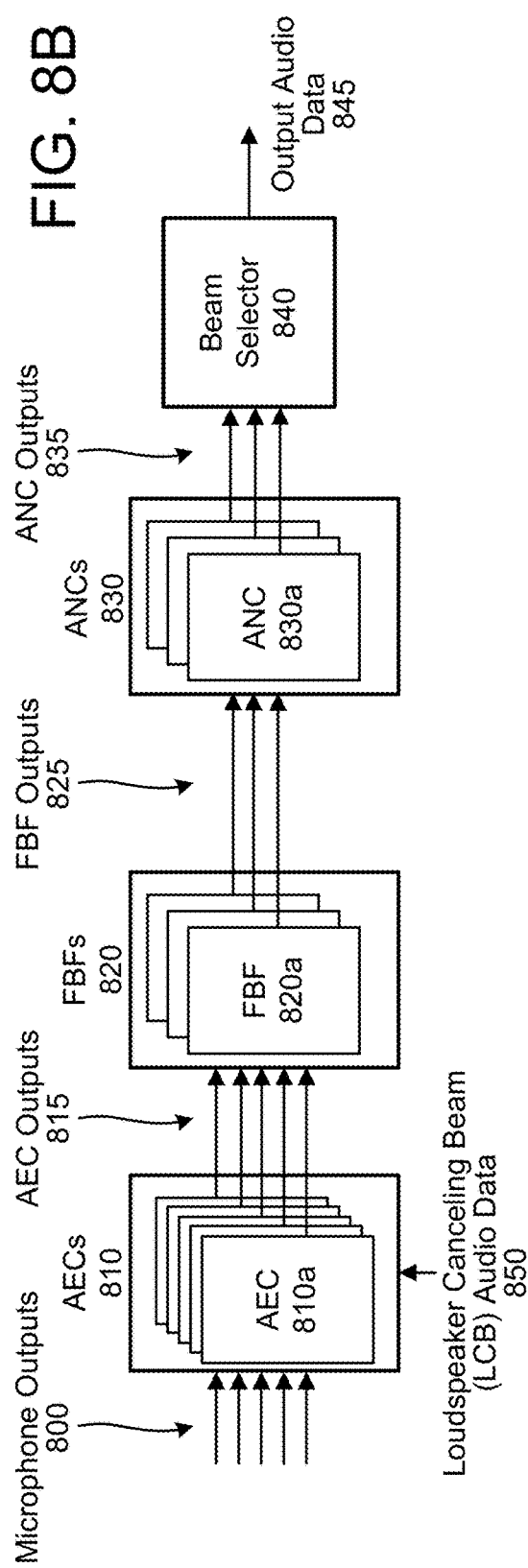
FIG. 8A
FIG. 8B

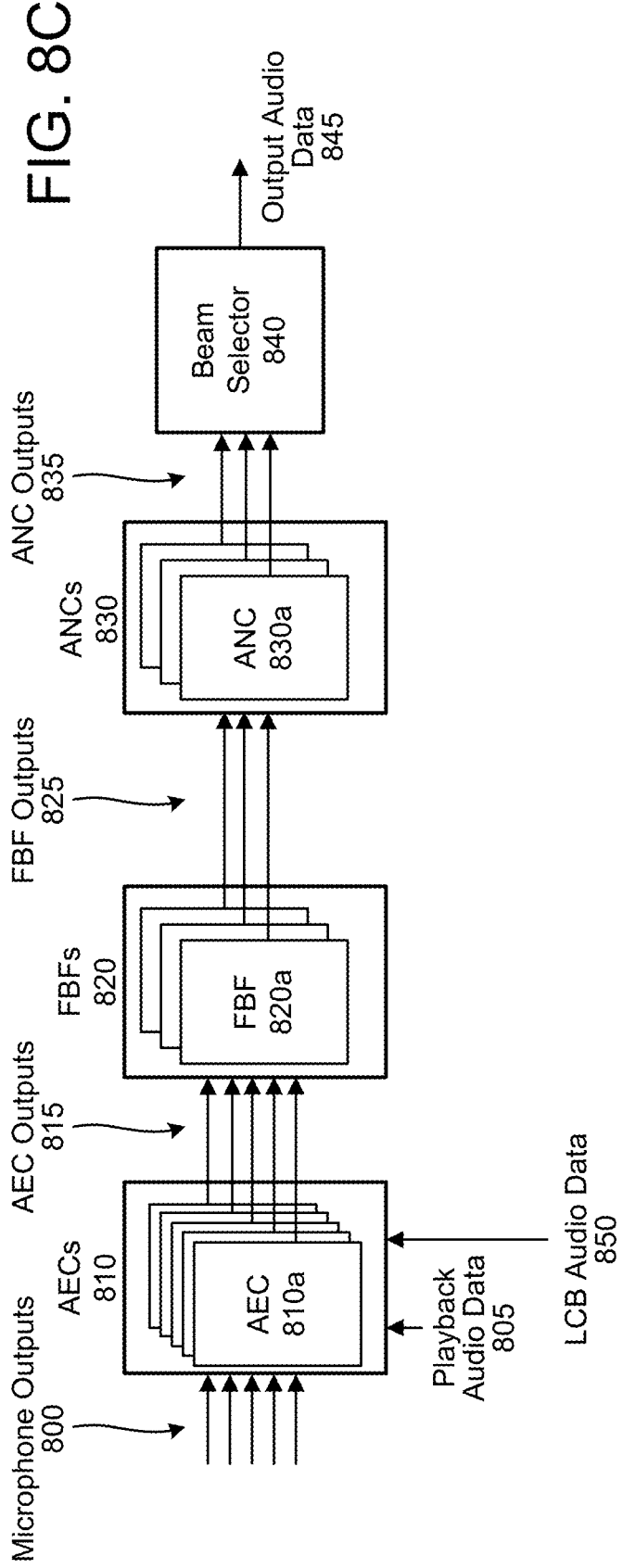

ACOUSTIC ECHO CANCELLATION WITH LOUDSPEAKER CANCELING BEAMFORMER

CROSS-REFERENCE TO RELATED APPLICATION

This application claims priority to U.S. Provisional Patent Application Ser. No. 62/619,289, entitled "Acoustic Echo Cancellation with Loudspeaker Canceling Beamformer," filed on Jan. 19, 2018, in the names of Mohamed Mansour, et al. The above provisional application is herein incorporated by reference in its entirety.

BACKGROUND

In audio systems, beamforming refers to techniques that are used to isolate audio from a particular direction. Beamforming may be particularly useful when filtering out noise from non-desired directions. Beamforming may be used for various tasks, including isolating voice commands to be executed by a speech-processing system.

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices, such as those with beamforming capability, to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a method for improving beam selection and reducing algorithm complexity according to embodiments of the present disclosure.

FIG. 2 illustrates a microphone array according to embodiments of the present disclosure.

FIG. 4 illustrates a beamforming device that combines a fixed beamformer unit and an adaptive beamformer unit according to embodiments of the present disclosure.

FIG. 6 illustrates a multiple FBF/ABF beamformer unit configuration for each beam according to embodiments of the present disclosure.

FIGS. 7A-7B illustrate examples of noise reference signals according to embodiments of the present disclosure.

FIG. 8A-8C illustrate examples of improving acoustic echo cancellation according to embodiments of the present disclosure.

DETAILED DESCRIPTION

Figure 3A:
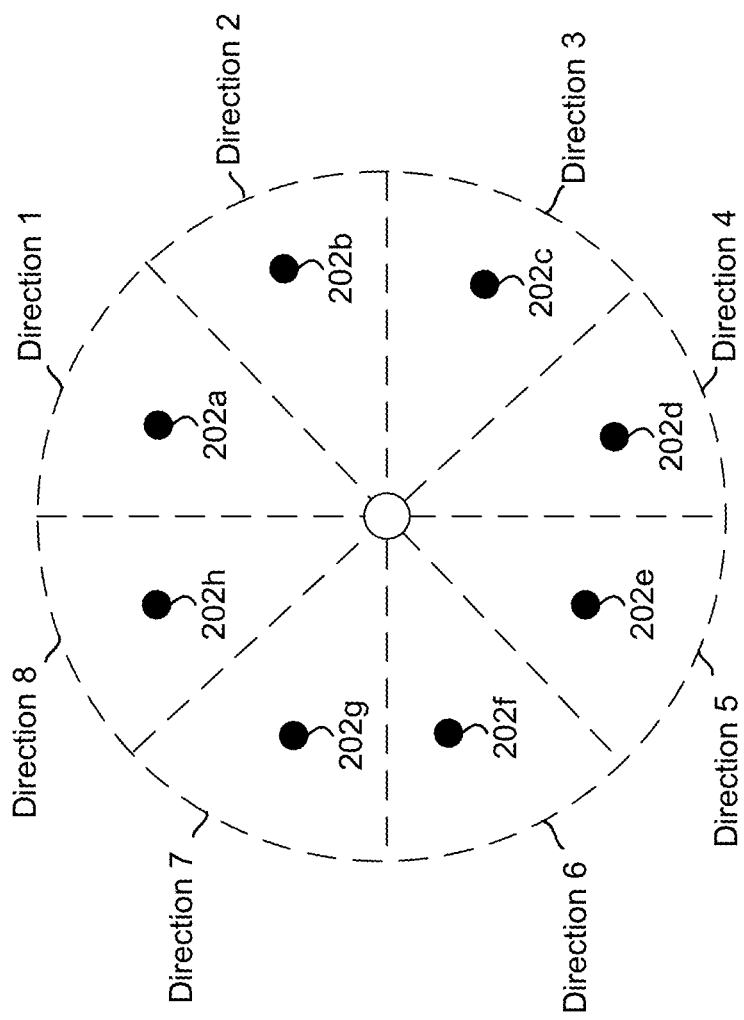
FIG. 3A illustrates associating directions with microphones of a microphone array according to embodiments of the present disclosure.

Certain devices capable of capturing speech for speech processing may operate using a microphone array comprising multiple microphones, where beamforming techniques may be used to isolate desired audio including speech. Beamforming systems isolate audio from a particular direction in a multi-directional audio capture system. One technique for beamforming involves boosting audio received from a desired direction while dampening audio received from a non-desired direction.

In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesireable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

In certain situations, such as when a loudspeaker is included in a housing of a device and/or the loudspeaker generates output audio at a high volume, conventional acoustic echo cancellation (AEC) techniques, the fixed beamformer unit, and/or the adaptive beamformer unit may be unable to attenuate an echo signal corresponding to the output audio generated by the loudspeaker. For example, playing the output audio at a high volume may cause distortion (e.g., harmonic distortion or the like) that the conventional AEC techniques or adaptive beamforming may be unable to remove from input audio data generated by the microphone array.

To improve acoustic echo cancellation and attenuate the echo signal, systems and methods are disclosed that determine a loudspeaker canceling beam (LCB) (e.g., fixed beam directed to the loudspeaker) and may use the LCB to generate LCB audio data that corresponds to the echo signal. For example, the system may perform simulation(s) based on a configuration of the device in order to generate a plurality of filter coefficient values corresponding to the loudspeaker. By subtracting the LCB audio data during acoustic echo cancellation, the system may attenuate the echo signal even when there is distortion or nonlinearity or the like. In some examples, the system may perform acoustic echo cancellation using the LCB audio data and playback audio data.

FIG. 1 illustrates a system 100 that includes a device 110 configured to capture input audio data, generate loudspeaker canceling beam (LCB) audio data corresponding to a loudspeaker of the device 110 and perform acoustic echo cancellation to subtract the LCB audio data from the input audio data. As illustrated in FIG. 1, the device 110 may include a microphone array 114 and one or more loudspeaker(s) 116. However, the disclosure is not limited thereto and the device 110 may include additional components without departing from the disclosure.

The device 110 may receive playback audio data and may generate output audio corresponding to the playback audio data using the one or more loudspeaker(s) 116. While generating the output audio, the device 110 may capture input audio data using the microphone array 114. In addition to capturing speech (e.g., the input audio data includes a representation of speech), the device 110 may capture a portion of the output audio generated by the loudspeaker(s) 116, which may be referred to as an "echo" or echo signal. Conventional systems isolate the speech in the input audio data by performing acoustic echo cancellation (AEC) to subtract the echo signal from the input audio data. For example, conventional acoustic echo cancellation may generate a reference signal based on the playback audio data and may subtract the reference signal from the input audio data to generate output audio data representing the speech.

As an alternative to generating the reference signal based on the playback audio data, Adaptive Reference Algorithm (ARA) processing may generate an adaptive reference signal based on the input audio data. To illustrate an example, the ARA processing may perform beamforming using the input audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform AEC by subtracting the reference signal from the target signal. As the input audio data is not limited to the echo signal, the ARA processing may remove other acoustic noise represented in the input audio data in addition to removing the echo. Therefore, the ARA processing may be referred to as performing AEC, adaptive noise cancellation (ANC), and/or adaptive interference cancellation (AIC) (e.g., adaptive acoustic interference cancellation) without departing from the disclosure.

As discussed in greater detail below, the device 110 may include an adaptive beamformer and may be configured to perform AEC/ANC/AIC using the ARA processing to isolate the speech in the input audio data. However, in certain situations, such as when the loudspeaker(s) 116 are included in a housing of the device 110 along with the microphone array 114 and/or the loudspeaker(s) 116 generate the output audio at a high volume, conventional AEC techniques and/or the ARA processing may be unable to attenuate the echo. For example, playing the output audio at a high volume may cause distortion (e.g., harmonic distortion or the like) that the conventional AEC techniques and/or the ARA algorithms may be unable to remove from the input audio data.

To improve acoustic echo cancellation and remove the echo signal, the system 100 may determine a loudspeaker canceling beam (LCB) (e.g., fixed beam directed to the loudspeaker(s) 116) and may use the LCB to generate LCB audio data that corresponds to the echo signal. For example, the system 100 may perform simulation(s), which will be described in greater detail below, to generate a plurality of filter coefficient values corresponding to the loudspeaker(s) 116. These filter coefficient values correspond to the loudspeaker canceling beam and are determined based on the configuration of the microphone array 114 and/or the loudspeaker(s) 116 on the device 110. Thus, the filter coefficient values are fixed and the device 110 may generate LCB audio data using the same filter coefficient values over time.

The device 110 may generate the LCB audio data by multiplying the filter coefficient values by a corresponding microphone signal (e.g., microphone channel). For example, the device 110 may multiply a first portion of the input audio data (e.g., first microphone channel) corresponding to a first microphone of the microphone array 114 by a first filter coefficient value, multiply a second portion of the input audio data (e.g., second microphone channel) corresponding to a second microphone of the microphone array 114 by a second filter coefficient value, and so on.

After generating the LCB audio data, the device 110 may perform acoustic echo cancellation by subtracting the LCB audio data (or at least a portion of the LCB audio data) from the input audio data. For example, the device 110 may perform first AEC processing to subtract the LCB audio data from the first portion of the input audio data, may perform second AEC processing to subtract the LCB audio data from the second portion of the input audio data, and so on. Thus, the device 110 may perform AEC processing based on a number of microphones included in the microphone array 114 (e.g., number of different output signals from the microphone array 114).

By subtracting the LCB audio data, the device 110 may remove at least a portion of the echo signal from the input audio data to generate modified input audio data. Thus, the modified input audio data may isolate the speech and include less distortion than the input audio data. However, in addition to the speech, the modified input audio data may still include a portion of the echo signal and/or may include other acoustic noise captured by the microphone array 114. For example, the modified input audio data may remove a large portion of the echo signal generated by the loudspeaker(s) 116, but may not remove other echo signals generated by remote loudspeaker(s) (e.g., wireless loudspeaker(s) that also generate the output audio based on the playback audio data), other ambient acoustic noise in an environment around the device 110 (e.g., mechanical sounds, vibrations, crowd noise, etc.), and/or undesired speech (e.g., second speech generated by a different user at the same time).

To further isolate the speech and/or improve the modified input audio data, the device 110 may input the modified input audio data to the adaptive beamformer to perform adaptive interference cancellation using the ARA processing. For example, the adaptive beamformer may generate a plurality of audio signals, determine one or more target signal(s), determine one or more reference signal(s), and generate output audio data by subtracting at least a portion of the reference signal(s) from the target signal(s).

While the process of beamforming performed by the adaptive beamformer is similar to generating the LCB audio data, the adaptive beamformer may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the adaptive beamformer may identify the reference signal(s) based on the signal strength values and/or using other inputs without departing from the disclosure. Thus, the target signal(s) and/or the reference signal(s) selected by the adaptive beamformer may vary, resulting in different filter coefficient values over time. In contrast, the filter coefficient values associated with the LCB are static.

As discussed above, the device 110 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones in the microphone array 114 (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficients associated with specific directions. For example, the device 110 may perform a first directional calculation by applying first filter coefficients to the input audio signals to generate the first beamformed audio data and may perform a second directional calculation by applying second filter coefficients to the input audio signals to generate the second beamformed audio data.

The filter coefficients used to perform the beamforming operation may be calculated offline (e.g., preconfigured ahead of time) and stored in the device 110. For example, the device 110 may store filter coefficients associated with hundreds of different directional calculations (e.g., hundreds of specific directions) and may select the desired filter coefficients for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the device 110 stores hundreds of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficients used to generate the first beam.

In addition to the beams associated with different directions, the device 110 may store (120) filter coefficient values associated with the loudspeaker canceling beam (LCB). Instead of corresponding to a direction pointing away from the device 110 (e.g., 360 degrees around the device 110), the loudspeaker canceling beam corresponds to a direction pointing from the microphone array 114 to the loudspeaker(s) 116. Thus, the loudspeaker canceling beam is fixed, with static filter coefficients that are calculated offline based on a configuration of the device 110. The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

The device 110 may receive (122) input audio data corresponding to audio captured by the microphone array 114 and may generate (124) loudspeaker canceling beam (LCB) audio data using the filter coefficient values. For example, the device 110 may generate the LCB audio data by multiplying the filter coefficient values by a corresponding microphone signal (e.g., portion of the input audio data associated with an individual microphone). For example, the device 110 may multiply a first portion of the input audio data (e.g., first microphone channel) corresponding to a first microphone of the microphone array 114 by a first filter coefficient value, multiply a second portion of the input audio data (e.g., second microphone channel) corresponding to a second microphone of the microphone array 114 by a second filter coefficient value, and so on.

The device 110 may perform (126) acoustic echo cancellation to remove (e.g. subtract) the LCB audio data from the input audio data and generate modified input audio data. The device 110 may perform acoustic echo cancellation separately for each microphone included in the microphone array 114. Thus, the device 110 may subtract at least a portion of the LCB audio data from each microphone channel.

In some examples, steps 124-126 may be performed in the time domain. For example, the device 110 may apply filter coefficient values g(t) in the time domain to the input audio data to generate the LCB audio data and may perform acoustic echo cancellation in the time domain. However, the disclosure is not limited thereto. Instead, the device 110 may receive first input audio data in the time domain and may perform Fast Fourier Transform (FFT) processing on the first input audio data to generate second input audio data in the frequency domain. The device 110 may then apply filter coefficient values g(ω) in the frequency domain to the second input audio data to generate the LCB audio data and may perform acoustic echo cancellation in the frequency domain to generate first modified input audio data. After performing the AEC, the device 110 may perform Inverse Fast Fourier Transform (IFFT) processing on the first modified input audio data to generate second modified input audio data in the time domain. Thus, the device 110 may generate the LCB audio data and perform acoustic echo cancellation in the time domain and/or the frequency domain without departing from the disclosure. Additionally or alternatively, the device 110 may generate the LCB audio data and perform acoustic echo cancellation in a subband domain without departing from the disclosure. For example, the device 110 may separate different frequency ranges (e.g., subbands) and may generate the LCB audio data and/or perform acoustic echo cancellation differently for each frequency range without departing from the disclosure.

The device may then beamform (128) the modified input audio data into a plurality of beams (e.g., perform a beamforming operation to generate beamformed audio data). As used herein, the term beam may refer to particular audio data corresponding to the modified input audio data that was captured by the microphone array, where the particular audio data of a beam corresponds to a particular direction. Thus, each beam may include audio data corresponding to a particular direction relative to the device 110. So a beamforming unit or component of the device (such as adaptive beamformer (ABF) unit 490 discussed below) may divide the modified input audio data into different beams of audio data, each corresponding to a direction.

The device 110 may determine (130) a target signal, may determine (132) a reference signal, and may generate (134) output audio data based on the target signal and the reference signal. For example, the device 110 may select first beamformed audio data as the target signal, may select second beamformed audio data as the reference signal, and may generate the output audio data by subtracting at least a portion of the second beamformed audio data from the first beamformed audio data. While FIG. 1 illustrates the device 110 selecting a single target signal and a single reference signal, the disclosure is not limited thereto and the device 110 may determine one or more target signal(s) and/or one or more reference signal(s) without departing from the disclosure.

By performing acoustic echo cancellation using the LCB audio data, the device 110 may subtract the echo signal from the input audio data. Thus, the modified input audio data may include a representation of speech, a representation of first acoustic noise generated by one or more noise sources, and/or a representation of ambient noise, but a representation of second acoustic noise generated by the loudspeaker(s) 116 is attenuated and/or canceled (e.g., subtracted or removed) from the modified input audio data. Similarly, performing the beamforming and applying the adaptive reference algorithm (ARA) processing to subtract the reference signal from the target signal cancels and/or attenuates the representation of the first acoustic noise and/or the representation of the ambient noise, without canceling or substantially attenuating the representation of the speech. Thus, the device 110 may isolate the speech and generate the output audio data.

Figure 3B:
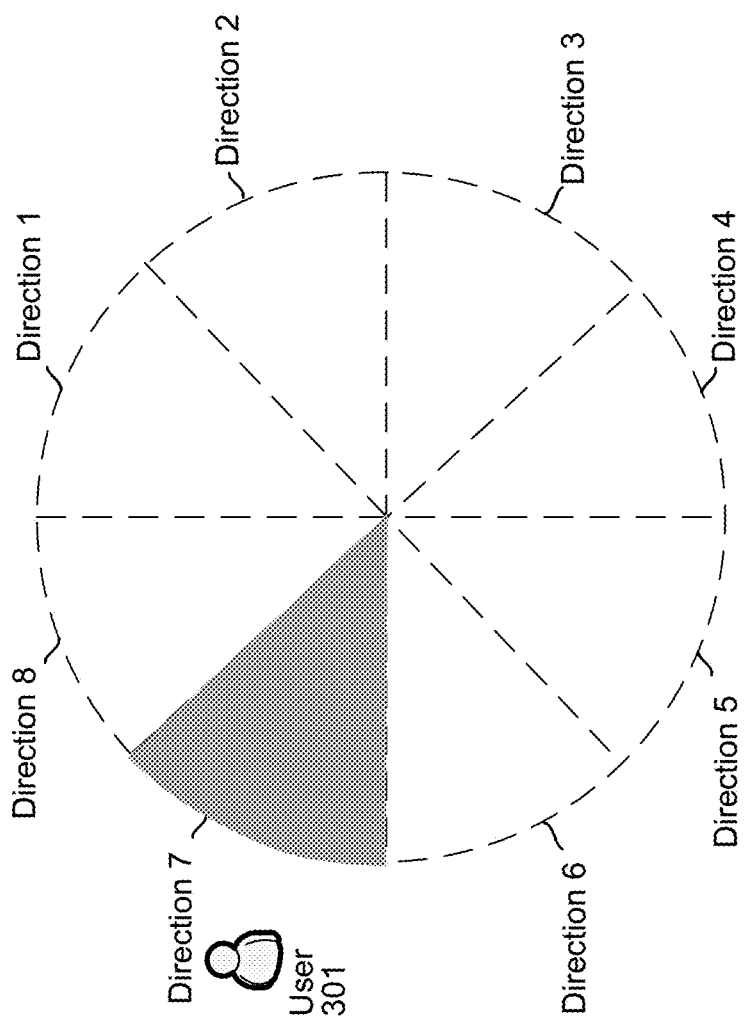
FIGS. 3B and 3C illustrate isolating audio from a direction to focus on a desired audio source according to embodiments of the present disclosure.
Figure 3C:
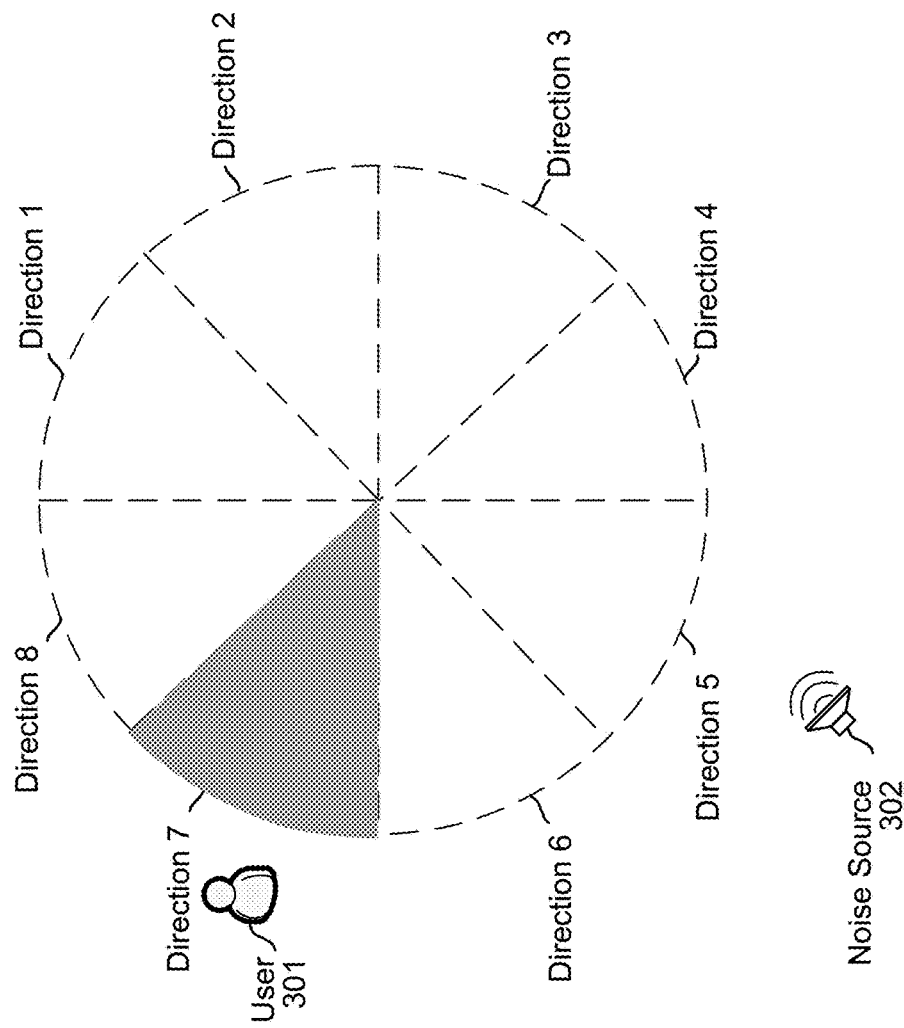

Further details of the device operation are described below following a discussion of directionality in reference to FIGS. 2-3C.

As illustrated in FIG. 2, a device 110 may include, among other components, a microphone array 114, one or more loudspeaker(s) 116, a beamformer unit (as discussed below), or other components. The microphone array may include a number of different individual microphones. In the example configuration of FIG. 2, the microphone array 114 includes eight (8) microphones, 502a-502h. The individual microphones may capture sound and pass the resulting audio signal created by the sound to a downstream component, such as an analysis filterbank discussed below. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. As shown in FIG. 3A, a particular direction may be associated with a particular microphone of a microphone array, where the azimuth angles for the plane of the microphone array may be divided into bins (e.g., 0-45 degrees, 46-90 degrees, and so forth) where each bin direction is associated with a microphone in the microphone array. For example, direction 1 is associated with microphone 502a, direction 2 is associated with microphone 502b, and so on. Alternatively, particular directions and/or beams may not necessarily be associated with a specific microphone.

To isolate audio from a particular direction the device may apply a variety of audio filters to the output of the microphones where certain audio is boosted while other audio is dampened, to create isolated audio corresponding to a particular direction, which may be referred to as a beam. While the number of beams may correspond to the number of microphones, this need not be the case. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, as explained below.

The device may use various techniques to determine the beam corresponding to the look-direction. If audio is detected first by a particular microphone the device 110 may determine that the source of the audio is associated with the direction of the microphone in the array. Other techniques may include determining what microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

For example, if audio data corresponding to a user's speech is first detected and/or is most strongly detected by microphone 502g, the device may determine that the user is located in a location in direction 7. Using a FBF unit or other such component, the device may isolate audio coming from direction 7 using techniques known to the art and/or explained herein. Thus, as shown in FIG. 4B, the device 110 may boost audio coming from direction 7, thus increasing the amplitude of audio data corresponding to speech from user 301 relative to other audio captured from other directions. In this manner, noise from diffuse sources that is coming from all the other directions will be dampened relative to the desired audio (e.g., speech from user 301) coming from direction 7.

One drawback to the FBF unit approach is that it may not function as well in dampening/canceling noise from a noise source that is not diffuse, but rather coherent and focused from a particular direction. For example, as shown in FIG. 3C, a noise source 302 may be coming from direction 5 but may be sufficiently loud that noise canceling/beamforming techniques using an FBF unit alone may not be sufficient to remove all the undesired audio coming from the noise source 302, thus resulting in an ultimate output audio signal determined by the device 110 that includes some representation of the desired audio resulting from user 301 but also some representation of the undesired audio resulting from noise source 302.

FIG. 4 illustrates a high-level conceptual block diagram of a device 110 configured to performing beamforming using a fixed beamformer unit and an adaptive noise canceller that can remove noise from particular directions using adaptively controlled coefficients which can adjust how much noise is cancelled from particular directions. The FBF unit 440 may be a separate component or may be included in another component such as an adaptive beamformer (ABF) unit 490. As explained below, the FBF unit may operate a filter and sum component 430 to isolate the first audio signal from the direction of an audio source.

The device 110 may also operate an adaptive noise canceller (ANC) unit 460 to amplify audio signals from directions other than the direction of an audio source. Those audio signals represent noise signals so the resulting amplified audio signals from the ABF unit may be referred to as noise reference signals 420, discussed further below. The device 110 may then weight the noise reference signals, for example using filters 422 discussed below. The device may combine the weighted noise reference signals 424 into a combined (weighted) noise reference signal 425. Alternatively the device may not weight the noise reference signals and may simply combine them into the combined noise reference signal 425 without weighting. The device may then subtract the combined noise reference signal 425 from the amplified first audio signal 432 to obtain a difference 436. The device may then output that difference, which represents the desired output audio signal with the noise removed. The diffuse noise is removed by the FBF unit when determining the signal 432 and the directional noise is removed when the combined noise reference signal 425 is subtracted. The device may also use the difference to create updated weights (for example for filters 422) to create updated weights that may be used to weight future audio signals. The step-size controller 404 may be used modulate the rate of adaptation from one weight to an updated weight.

In this manner noise reference signals are used to adaptively estimate the noise contained in the output signal of the FBF unit using the noise-estimation filters 422. This noise estimate is then subtracted from the FBF unit output signal to obtain the final ABF unit output signal. The ABF unit output signal is also used to adaptively update the coefficients of the noise-estimation filters. Lastly, we make use of a robust step-size controller to control the rate of adaptation of the noise estimation filters.

As shown in FIG. 4, input audio data 411 captured by a microphone array may be input into an analysis filterbank 410. The filterbank 410 may include a uniform discrete Fourier transform (DFT) filterbank which converts input audio data 411 in the time domain into an microphone outputs 800 in the sub-band domain. The audio signal X may incorporate audio signals corresponding to multiple different microphones as well as different sub-bands (i.e., frequency ranges) as well as different frame indices (i.e., time ranges). Thus the audio signal from the mth microphone may be represented as $X_m(k,n)$, where k denotes the sub-band index and n denotes the frame index. The combination of all audio signals for all microphones for a particular sub-band index frame index may be represented as $X(k,n)$.

Figure 5:
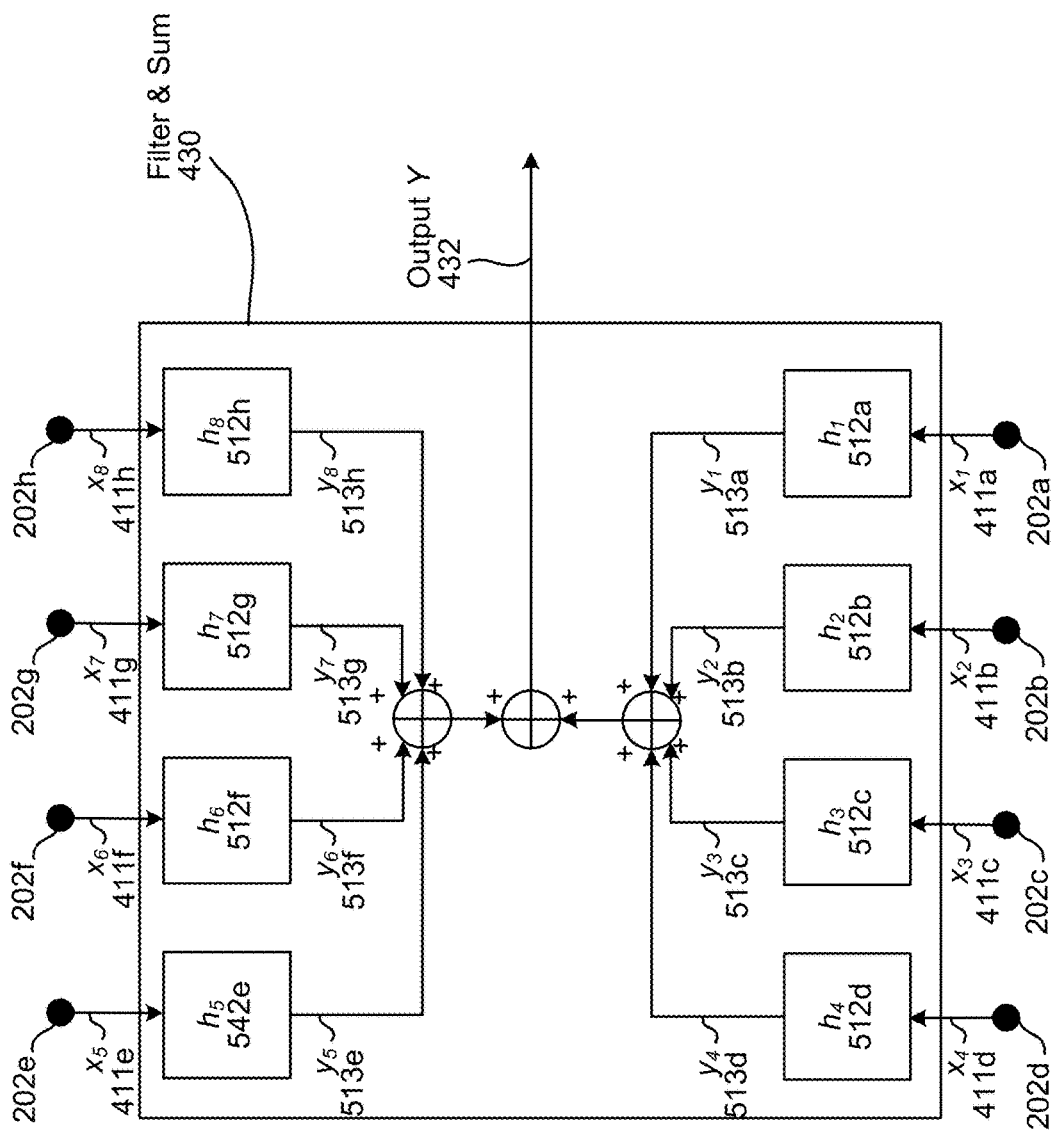
FIG. 5 illustrates a filter and sum component according to embodiments of the present disclosure.

The microphone outputs 800 may be passed to the FBF unit 440 including the filter and sum unit 430. The FBF unit 440 may be implemented as a robust super-directive beamformer unit, delayed sum beamformer unit, or the like. The FBF unit 440 is presently illustrated as a super-directive beamformer (SDBF) unit due to its improved directivity properties. The filter and sum unit 430 takes the audio signals from each of the microphones and boosts the audio signal from the microphone associated with the desired look direction and attenuates signals arriving from other microphones/directions. The filter and sum unit 430 may operate as illustrated in FIG. 5. As shown in FIG. 5, the filter and sum unit 430 may be configured to match the number of microphones of the microphone array. For example, for a microphone array with eight microphones, the filter and sum unit may have eight filter blocks 512. The input audio signals $x_1$ 411a through $x_8$ 411h for each microphone (e.g., microphones 1 through 8) are received by the filter and sum unit 430. The audio signals $x_1$ 411a through $x_8$ 411h correspond to individual microphones 502a through 502h, for example audio signal $x_1$ 411a corresponds to microphone 502a, audio signal $x_2$ 411b corresponds to microphone 502b and so forth. Although shown as originating at the microphones, the audio signals $x_1$ 411a through $x_8$ 411h may be in the sub-band domain and thus may actually be output by the analysis filterbank before arriving at the filter and sum component 430. Each filter block 512 is also associated with a particular microphone. Each filter block is configured to either boost (e.g., increase) or dampen (e.g., decrease) its respective incoming audio signal by the respective beamformer filter coefficient h depending on the configuration of the FBF unit. Each resulting filtered audio signal y 513 will be the audio signal x 411 weighted by the beamformer filter coefficient h of the filter block 512. For example, $y_1=x_1*h_1$, $y_2=x_2*h_2$, and so forth. The filter coefficients are configured for a particular FBF unit associated with a particular beam.

As illustrated in FIG. 6, the adaptive beamformer (ABF) unit 490 configuration (including the FBF unit 440 and the ANC unit 460) illustrated in FIG. 4, may be implemented multiple times in a single device 110. The number of adaptive beamformer (ABF) unit 490 blocks may correspond to the number of beams B. For example, if there are eight beams, there may be eight FBF units 440 and eight ANC units 460. Each adaptive beamformer (ABF) unit 490 may operate as described in reference to FIG. 4, with an individual output E 436 for each beam created by the respective adaptive beamformer (ABF) unit 490. Thus, B different outputs 436 may result. For device configuration purposes, there may also be B different other components, such as the synthesis filterbank 428, but that may depend on device configuration. Each individual adaptive beamformer (ABF) unit 490 may result in its own beamformed audio data Z 450, such that there may be B different beamformed audio data portions Z 450. Each beam's respective beamformed audio data Z 450 may be in a format corresponding to an input audio data 411 or in an alternate format. For example, the input audio data 411 and/or the beamformed audio data Z 450 may be sampled at a rate corresponding to 16 kHz and a mono-channel at 16 bits per sample, little endian format. Audio data in little endian format corresponds to storing the least significant byte of the audio data in the smallest address, as opposed to big endian format where the most significant byte of the audio data is stored in the smallest address.

Each particular FBF unit may be tuned with filter coefficients to boost audio from one of the particular beams. For example, FBF unit 440-1 may be tuned to boost audio from beam 1, FBF unit 440-2 may be tuned to boost audio from beam 2 and so forth. If the filter block is associated with the particular beam, its beamformer filter coefficient h will be high whereas if the filter block is associated with a different beam, its beamformer filter coefficient h will be lower. For example, for FBF unit 440-7, direction 7, the beamformer filter coefficient $h_7$ for filter 512g may be high while beamformer filter coefficients $h_1$-$h_6$ and $h_8$ may be lower. Thus the filtered audio signal $y_7$ will be comparatively stronger than the filtered audio signals $y_1$-$y_6$ and $y_8$ thus boosting audio from direction 7 relative to the other directions. The filtered audio signals will then be summed together to create the output audio signal The filtered audio signals will then be summed together to create the output audio signal $Y_f$ 432. Thus, the FBF unit 440 may phase align microphone audio data toward a give n direction and add it up. So signals that are arriving from a particular direction are reinforced, but signals that are not arriving from the look direction are suppressed. The robust FBF coefficients are designed by solving a constrained convex optimization problem and by specifically taking into account the gain and phase mismatch on the microphones.

The individual beamformer filter coefficients may be represented as $H_{BF,m}(r)$, where r=0, . . . R, where R denotes the number of beamformer filter coefficients in the subband domain. Thus, the output $Y_f$ 432 of the filter and sum unit 430 may be represented as the summation of each microphone signal filtered by its beamformer coefficient and summed up across the M microphones:

$$Y(k, n) = \sum_{m=1}^{M} \sum_{r=0}^{R} H_{BF,m}(r) X_m(k, n-r) \tag{1}$$

Turning once again to FIG. 4, the output $Y_f$ 432, expressed in Equation 1, may be fed into a delay component 434, which delays the forwarding of the output Y until further adaptive noise canceling functions as described below may be performed. One drawback to output $Y_f$ 432, however, is that it may include residual directional noise that was not canceled by the FBF unit 440. To remove that directional noise, the device 110 may operate an adaptive noise canceller (ANC) unit 460 which includes components to obtain the remaining noise reference signal which may be used to remove the remaining noise from output Y.

As shown in FIG. 4, the adaptive noise canceller may include a number of nullformer blocks 418a through 418p. The device 110 may include P number of nullformer blocks 418 where P corresponds to the number of channels, where each channel corresponds to a direction in which the device may focus the nullformers 418 to isolate detected noise. The number of channels P is configurable and may be predetermined for a particular device 110. Each nullformer block is configured to operate similarly to the filter and sum block 430, only instead of the filter coefficients for the nullformer blocks being selected to boost the look ahead direction, they are selected to boost one of the other, non-look ahead directions. Thus, for example, nullformer 418a is configured to boost audio from direction 1, nullformer 418b is configured to boost audio from direction 2, and so forth. Thus, the nullformer may actually dampen the desired audio (e.g., speech) while boosting and isolating undesired audio (e.g., noise). For example, nullformer 418a may be configured (e.g., using a high filter coefficient $h_1$ 512a) to boost the signal from microphone 502a/direction 1, regardless of the look ahead direction. Nullformers 418b through 418p may operate in similar fashion relative to their respective microphones/directions, though the individual coefficients for a particular channel's nullformer in one beam pipeline may differ from the individual coefficients from a nullformer for the same channel in a different beam's pipeline. The output Z 420 of each nullformer 418 will be a boosted signal corresponding to a non-desired direction. As audio from non-desired direction may include noise, each signal Z 420 may be referred to as a noise reference signal. Thus, for each channel 1 through P the adaptive noise canceller (ANC) unit 460 calculates a noise reference signal Z 420, namely $Z_1$ 420a through $Z_P$ 420p. Thus, the noise reference signals that are acquired by spatially focusing towards the various noise sources in the environment and away from the desired look-direction. The noise reference signal for channel p may thus be represented as $Z_p(k,n)$ where $Z_P$ is calculated as follows:

$$Z_p(k, n) = \sum_{m=1}^{M} \sum_{r=0}^{R} H_{NF,m}(p, r) X_m(k, n-r) \tag{2}$$

where $H_{NF,m}(p,r)$ represents the nullformer coefficients for reference channel p.

As described above, the coefficients for the nullformer filters 512 are designed to form a spatial null toward the look ahead direction while focusing on other directions, such as directions of dominant noise sources (e.g., noise source 302). The output from the individual nullformers $Z_1$ 420a through $Z_P$ 420p thus represent the noise from channels 1 through P.

The individual noise reference signals may then be filtered by noise estimation filter blocks 422 configured with weights W to adjust how much each individual channel's noise reference signal should be weighted in the eventual combined noise reference signal $\hat{Y}$ 425. The noise estimation filters (further discussed below) are selected to isolate the noise to be removed from output $Y_f$ 432. The individual channel's weighted noise reference signal $\hat{y}$ 424 is thus the channel's noise reference signal Z multiplied by the channel's weight W. For example, $\hat{y}=Z_1*W_1$, $\hat{y}_2=Z_2*W_2$, and so forth. Thus, the combined weighted noise estimate $\hat{Y}$ 425 may be represented as:

$$\hat{Y}_P(k,n) = \sum_{l=0}^{L} W_P(k,n,l) Z_P(k,n-l) \quad (3)$$

where $W_p(k,n,l)$ is the lth element of $W_p(k,n)$ and l denotes the index for the filter coefficient in subband domain. The noise estimates of the P reference channels are then added to obtain the overall noise estimate:

$$\hat{Y}(k, n) = \sum_{p=1}^{P} \hat{Y}_p(k, n) \quad (4)$$

The combined weighted noise reference signal $\hat{Y}$ 425, which represents the estimated noise in the audio signal, may then be subtracted from the FBF unit output $Y_f$ 432 to obtain a signal E 436, which represents the error between the combined weighted noise reference signal $\hat{Y}$ 425 and the FBF unit output $Y_f$ 432. That error, E 436, is thus the estimated desired non-noise portion (e.g., target signal portion) of the audio signal and may be the output of the adaptive noise canceller (ANC) unit 460. That error, E 436, may be represented as:

$$E(k,n) = Y(k,n) - \hat{Y}(k,n) \quad (5)$$

As shown in FIG. 4, the ABF unit output signal 436 may also be used to update the weights W of the noise estimation filter blocks 422 using sub-band adaptive filters, such as with a normalized least mean square (NLMS) approach:

$$W_p(k, n) = W_p(k, n-1) + \frac{\mu_p(k, n)}{\|z_p(k, n)\|^2 + \varepsilon} z_p(k, n) E(k, n) \quad (6)$$

where $Z_p(k,n) = [Z_p(k,n) \; Z_p(k,n-1) \; \ldots \; Z_p(k,n-L)]^T$ is the noise estimation vector for the pth channel, $\mu_p(k,n)$ is the adaptation step-size for the pth channel, and $\varepsilon$ is a regularization factor to avoid indeterministic division. The weights may correspond to how much noise is coming from a particular direction.

As can be seen in Equation 6, the updating of the weights W involves feedback. The weights W are recursively updated by the weight correction term (the second half of the right hand side of Equation 6) which depends on the adaptation step size, $\mu_p(k,n)$, which is a weighting factor adjustment to be added to the previous weighting factor for the filter to obtain the next weighting factor for the filter (to be applied to the next incoming signal). To ensure that the weights are updated robustly (to avoid, for example, target signal cancellation) the step size $\mu_p(k,n)$ may be modulated according to signal conditions. For example, when the desired signal arrives from the look-direction, the step-size is significantly reduced, thereby slowing down the adaptation process and avoiding unnecessary changes of the weights W. Likewise, when there is no signal activity in the look-direction, the step-size may be increased to achieve a larger value so that weight adaptation continues normally. The step-size may be greater than 0, and may be limited to a maximum value. Thus, the device may be configured to determine when there is an active source (e.g., a speaking user) in the look-direction. The device may perform this determination with a frequency that depends on the adaptation step size.

The step-size controller 404 will modulate the rate of adaptation. Although not shown in FIG. 4, the step-size controller 404 may receive various inputs to control the step size and rate of adaptation including the noise reference signals 420, the FBF unit output $Y_f$ 432, the previous step size, the nominal step size (described below) and other data. The step-size controller may calculate Equations 6-13 below. In particular, the step-size controller 404 may compute the adaptation step-size for each channel p, sub-band k, and frame n. To make the measurement of whether there is an active source in the look-direction, the device may measure a ratio of the energy content of the beam in the look direction (e.g., the look direction signal in output $Y_f$ 432) to the ratio of the energy content of the beams in the non-look directions (e.g., the non-look direction signals of noise reference signals $Z_1$ 420a through $Z_P$ 420p). This may be referred to as a beam-to-null ratio (BNR). For each subband, the device may measure the BNR. If the BNR is large, then an active source may be found in the look direction, if not, an active source may not be in the look direction.

The BNR may be computed as:

$$BNR_p(k, n) = \frac{B_{YY}(k, n)}{N_{ZZ,p}(k, n) + \delta}, k \in [k_{LB}, k_{UB}] \quad (7)$$

where, $k_{LB}$ denotes the lower bound for the subband range bin and $k_{UB}$ denotes the upper bound for the subband range bin under consideration, and $\delta$ is a regularization factor. Further, $B_{YY}(k,n)$ denotes the powers of the fixed beamformer output signal (e.g., output $Y_f$ 432) and $N_{ZZ,p}(k,n)$ denotes the powers of the pth nullformer output signals (e.g., the noise reference signals $Z_1$ 420a through $Z_P$ 420p). The powers may be calculated using first order recursive averaging as shown below:

$$B_{YY}(k,n) = \alpha B_{YY}(k,n-1) + (1-\alpha)|Y(k,n)|^2$$

$$N_{ZZ,p}(k,n) = \alpha N_{ZZ,p}(k,n-1) + (1-\alpha)|Z_p(k,n)|^2 \quad (8)$$

where, $\alpha \in [0,1]$ is a smoothing parameter.

The BNR values may be limited to a minimum and maximum value as follows:

$$BNR_p(k,n) \in [BNR_{min}, BNR_{max}]$$

the BNR may be averaged across the subband bins:

$$BNR_p(n) = \frac{1}{(k_{UB} - k_{LB} + 1)} \sum_{k_{LB}}^{k_{UB}} BNR_p(k, n) \quad (9)$$

the above value may be smoothed recursively to arrive at the mean BNR value:

$$\overline{BNR}_p(n) = \beta \overline{BNR}_p(n-1) + (1-\beta) BNR_p(n) \quad (10)$$

where $\beta$ is a smoothing factor.

The mean BNR value may then be transformed into a scaling factor in the interval of [0,1] using a sigmoid transformation:

$$\xi(n) = 1 - 0.5\left(1 + \frac{\upsilon(n)}{1 + |\upsilon(n)|}\right) \quad (11)$$

$$\text{where } \upsilon(n) = \gamma(\overline{BNR}_p(n) - \sigma) \quad (12)$$

and γ and σ are tunable parameters that denote the slope (γ) and point of inflection (σ), for the sigmoid function.

Using Equation 11, the adaptation step-size for subband k and frame-index n is obtained as:

$$\mu_p(k, n) = \xi(n)\left(\frac{N_{ZZ,p}(k, n)}{B_{YY}(k, n) + \delta}\right)\mu_o \quad (13)$$

where $\mu_o$ is a nominal step-size. $\mu_o$ may be used as an initial step size with scaling factors and the processes above used to modulate the step size during processing.

At a first time period, audio signals from the microphone array 114 may be processed as described above using a first set of weights for the filters 422. Then, the error E 436 associated with that first time period may be used to calculate a new set of weights for the filters 422, where the new set of weights is determined using the step size calculations described above. The new set of weights may then be used to process audio signals from a microphone array 114 associated with a second time period that occurs after the first time period. Thus, for example, a first filter weight may be applied to a noise reference signal associated with a first audio signal for a first microphone/first direction from the first time period. A new first filter weight may then be calculated using the method above and the new first filter weight may then be applied to a noise reference signal associated with the first audio signal for the first microphone/first direction from the second time period. The same process may be applied to other filter weights and other audio signals from other microphones/directions.

The above processes and calculations may be performed across sub-bands k, across channels p and for audio frames n, as illustrated in the particular calculations and equations.

The estimated non-noise (e.g., output) audio signal E 436 may be processed by a synthesis filterbank 428 which converts the signal 436 into time-domain beamformed audio data Z 450 which may be sent to a downstream component for further operation. As illustrated in FIG. 6, there may be one component audio signal E 436 for each beam, thus for B beams there may be B audio signals E 436. Similarly, there may be one stream of beamformed audio data Z 450 for each beam, thus for B beams there may be B beamformed audio signals B 450. For example, a first beamformed audio signal may correspond to a first beam and to a first direction, a second beamformed audio signal may correspond to a second beam and to a second direction, and so forth.

As shown in FIGS. 4 and 6, the input audio data from a microphone array may include audio data 411 for each microphone 0 through M in the time domain, which may be converted by the analysis filterbank into spectral domain audio signals X 413 for each microphone 0 through M. The beamformer unit may then convert the audio signals X 413 into beamformer output signals E 436 in the spectral domain, with one signal for each beam 0 through B. The synthesis filterbank may then may convert the signals E 436 into time domain beamformer audio data Z 450, with one set of audio data Z 450 for each beam 0 through B.

Figure 7B:
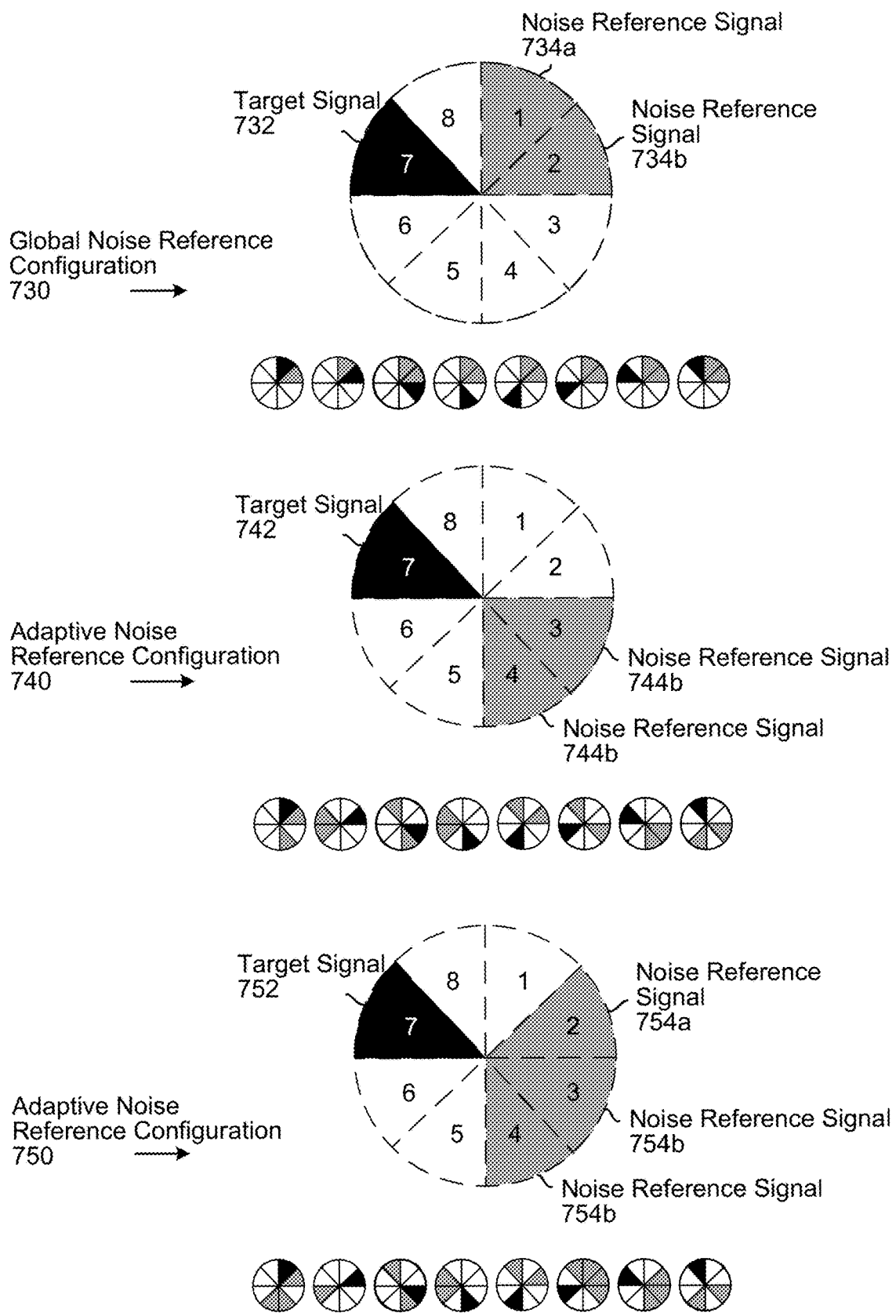

FIGS. 7A-7B illustrate examples of noise reference signals according to embodiments of the present disclosure. The device 110 may determine the noise reference signal(s) using a variety of techniques. In some examples, the device 110 may use the same noise reference signal(s) for each of the directional outputs. For example, the device 110 may select a first directional output associated with a particular direction as a noise reference signal and may determine the signal quality metric for each of the directional outputs by dividing a power value associated with an individual directional output by a power value associated with the first directional output (e.g., noise power level). Thus, the device 110 may determine a first signal quality metric by dividing a first power level associated with a second directional output by the noise power level, may determine a second signal quality metric by dividing a second power level associated with a third directional output by the noise power level, and so on. As the noise reference signal is the same for each of the directional outputs, instead of determining a ratio the device 110 may use the power level associated with each of the directional outputs as the signal quality metrics.

In some examples, each directional output may be associated with unique noise reference signal(s). To illustrate an example, the device 110 may determine the noise reference signal(s) using a fixed configuration based on the directional output. For example, the device 110 may select a first directional output (e.g., Direction 1) and may choose a second directional output (e.g., Direction 5, opposite Direction 1 when there are eight beams corresponding to eight different directions) as a first noise reference signal for the first directional output, may select a third directional output (e.g., Direction 2) and may choose a fourth directional output (e.g., Direction 6) as a second noise reference signal for the third directional output, and so on. This is illustrated in FIG. 7A as a single fixed noise reference configuration 710.

As illustrated in FIG. 7A, in the single fixed noise reference configuration 710, the device 110 may select a seventh directional output (e.g., Direction 7) as a target signal 712 and select a third directional output (e.g., Direction 3) as a noise reference signal 714. The device 110 may continue this pattern for each of the directional outputs, using Direction 1 as a target signal and Direction 5 as a noise reference signal, Direction 2 as a target signal and Direction 6 as a noise reference signal, Direction 3 as a target signal and Direction 7 as a noise reference signal, Direction 4 as a target signal and Direction 8 as a noise reference signal, Direction 5 as a target signal and Direction 1 as a noise reference signal, Direction 6 as a target signal and Direction 2 as a noise reference signal, Direction 7 as a target signal and Direction 3 as a noise reference signal, and Direction 8 as a target signal and Direction 4 as a noise reference signal.

As an alternative, the device 110 may use a double fixed noise reference configuration 720. For example, the device 110 may select the seventh directional output (e.g., Direction 7) as a target signal 722 and may select a second directional output (e.g., Direction 2) as a first noise reference signal 724a and a fourth directional output (e.g., Direction 4) as a second noise reference signal 724b. The device 110 may continue this pattern for each of the directional outputs, using Direction 1 as a target signal and Directions 4/6 as noise reference signals, Direction 2 as a target signal and Directions 5/7 as noise reference signals, Direction 3 as a target signal and Directions 6/8 as noise reference signals, Direction 4 as a target signal and Directions 7/9 as noise reference signal, Direction 5 as a target signal and Directions 8/2 as noise reference signals, Direction 6 as a target signal and Directions 1/3 as noise reference signals, Direction 7 as a target signal and Directions 2/4 as noise reference signals, and Direction 8 as a target signal and Directions 3/5 as noise reference signals.

While FIG. 7A illustrates using a fixed configuration to determine noise reference signal(s), the disclosure is not limited thereto. FIG. 7B illustrates examples of the device 110 selecting noise reference signal(s) differently for each target signal. As a first example, the device 110 may use a global noise reference configuration 730. For example, the device 110 may select the seventh directional output (e.g., Direction 7) as a target signal 732 and may select the first directional output (e.g., Direction 1) as a first noise reference signal 734a and the second directional output (e.g., Direction 2) as a second noise reference signal 734b. The device 110 may use the first noise reference signal 734a and the second noise reference signal 734b for each of the directional outputs (e.g., Directions 1-8).

As a second example, the device 110 may use an adaptive noise reference configuration 740, which selects two directional outputs as noise reference signals for each target signal. For example, the device 110 may select the seventh directional output (e.g., Direction 7) as a target signal 742 and may select the third directional output (e.g., Direction 3) as a first noise reference signal 744a and the fourth directional output (e.g., Direction 4) as a second noise reference signal 744b. However, the noise reference signals may vary for each of the target signals, as illustrated in FIG. 7B.

As a third example, the device 110 may use an adaptive noise reference configuration 750, which selects one or more directional outputs as noise reference signals for each target signal. For example, the device 110 may select the seventh directional output (e.g., Direction 7) as a target signal 752 and may select the second directional output (e.g., Direction 2) as a first noise reference signal 754a, the third directional output (e.g., Direction 3) as a second noise reference signal 754b, and the fourth directional output (e.g., Direction 4) as a third noise reference signal 754c. However, the noise reference signals may vary for each of the target signals, as illustrated in FIG. 7B, with a number of noise reference signals varying between one (e.g., Direction 6 as a noise reference signal for Direction 2) and four (e.g., Directions 1-3 and 8 as noise reference signals for Direction 6).

In some examples, the device 110 may determine a number of noise references based on a number of dominant audio sources. For example, if someone is talking while music is playing over loudspeakers and a blender is active, the device 110 may detect three dominant audio sources (e.g., talker, loudspeaker, and blender) and may select one dominant audio source as a target signal and two dominant audio sources as noise reference signals. Thus, the device 110 may select first audio data corresponding to the person speaking as a first target signal and select second audio data corresponding to the loudspeaker and third audio data corresponding to the blender as first reference signals. Similarly, the device 110 may select the second audio data as a second target signal and the first audio data and the third audio data as second reference signals, and may select the third audio data as a third target signal and the first audio data and the second audio data as third reference signals.

Additionally or alternatively, the device 110 may track the noise reference signal(s) over time. For example, if the music is playing over a portable loudspeaker that moves around the room, the device 110 may associate the portable loudspeaker with a noise reference signal and may select different portions of the beamformed audio data based on a location of the portable loudspeaker. Thus, while the direction associated with the portable loudspeaker changes over time, the device 110 selects beamformed audio data corresponding to a current direction as the noise reference signal.

While some of the examples described above refer to determining instantaneous values for a signal quality metric (e.g., a signal-to-interference ratio (SIR), a signal-to-noise ratio (SNR), or the like), the disclosure is not limited thereto.

Instead, the device 110 may determine the instantaneous values and use the instantaneous values to determine average values for the signal quality metric. Thus, the device 110 may use average values or other calculations that do not vary drastically over a short period of time in order to select which signals on which to perform additional processing. For example, a first audio signal associated with an audio source (e.g., person speaking, loudspeaker, etc.) may be associated with consistently strong signal quality metrics (e.g., high SIR/SNR) and intermittent weak signal quality metrics. The device 110 may average the strong signal metrics and the weak signal quality metrics and continue to track the audio source even when the signal quality metrics are weak without departing from the disclosure.

As discussed above, electronic devices may perform acoustic echo cancellation to remove and/or attenuate an echo signal captured in the input audio data. For example, the device 110 may receive playback audio data and may generate output audio corresponding to the playback audio data using the one or more loudspeaker(s) 116. While generating the output audio, the device 110 may capture input audio data using the microphone array 114. In addition to capturing speech (e.g., the input audio data includes a representation of speech), the device 110 may capture a portion of the output audio generated by the loudspeaker(s) 116, which may be referred to as an "echo" or echo signal. Conventional systems isolate the speech in the input audio data by performing acoustic echo cancellation (AEC) to remove the echo signal from the input audio data. For example, conventional acoustic echo cancellation may generate a reference signal based on the playback audio data and may remove the reference signal from the input audio data to generate output audio data representing the speech. However, the device 110 may improve acoustic echo cancellation by generating the reference signal using a loudspeaker canceling beam (LCB) to select a portion of the input audio data corresponding to the loudspeaker(s) 116 as the reference signal. Additionally or alternatively, the device 110 may combine the two and generate the reference signal based on the playback audio data and the loudspeaker canceling beam without departing from the disclosure.

FIG. 8A-8C illustrate examples of improving acoustic echo cancellation according to embodiments of the present disclosure. As illustrated in FIG. 8A, typically acoustic echo cancellation is performed by generating a reference signal based on playback audio data 805. For example, microphone outputs 800 (e.g., input audio data captured by the microphone array 114) is input to one or more acoustic echo cancellation components (AECs) 810 and the AECs generate AEC outputs 815 by canceling an echo signal.

To illustrate an example of canceling the echo signal, playback audio data 805 may be sent to one or more loudspeaker(s) 116 and the loudspeaker(s) 116 may generate output audio based on the playback audio data 805. For example, the playback audio data 805 may correspond to music and the one or more loudspeaker(s) 116 may play the music. The microphone array 114 may capture a portion of the output audio (e.g., capture a portion of the music) and generate the microphone outputs 800, which may include a representation of the output audio as an "echo signal." Therefore, a portion of the microphone outputs 800 may correspond to the output audio or echo signal and may interfere with speech processing or other processing that is used to process an utterance (e.g., speech) captured by the microphone array 114 and included in the microphone outputs 800.

To remove (e.g., subtract or cancel) and/or attenuate the echo signal from the microphone outputs 800, in some examples the ABCs 810 may determine an estimated echo signal based on the playback audio data 805. For example, the device 110 may process the playback audio data 805, synchronize the playback audio data 805 with the microphone outputs 800, apply adaptive filters to the playback audio data 805 to generate the estimated echo signal and subtract the estimated echo signal from the microphone outputs 800. Thus, the AEC outputs 815 correspond to the microphone outputs 800 after subtracting the estimated echo signal.

A number of AEC components included in the AECs 810 may depend on a number of audio channels. In some examples, the device 110 may include an AEC component 810 for each microphone included in the microphone array 114, such that each microphone output 800 is processed by a separate AEC component 810. For example, if the microphone array 114 includes eight microphones, the AECs 810 may include eight AEC components (e.g., 810a-810h). However, the disclosure is not limited thereto and the number of microphones and/or AEC components 810 may vary without departing from the disclosure. Additionally or alternatively, a single AEC component 810 may generate AEC outputs 815 for multiple microphones without departing from the disclosure.

After performing AEC to generate the AEC outputs 815, the AEC outputs 815 may be input to one or more fixed beamformer (FBF) units 820. The fixed beamformer units may isolate audio from a desired direction by boosting audio received from the desired direction while dampening audio received from a non-desired direction. For example, each of the FBF units 820 may include a filter-and-sum structure to boost an audio signal that originates from the desired direction (e.g., look-direction) while largely attenuating audio signals that originate from other directions.

A number of fixed beamformer units included in the FBF units 820 may depend on a desired number of beams. For example, to generate twelve beams, the device 110 may include twelve separate fixed beamformer units (e.g., 820a-820l), with each fixed beamformer unit processing the AEC outputs 815 to generate an individual beam (e.g., directional output, directional audio signal, beamformed audio data, or the like) corresponding to a particular direction. The FBF units 820 may generate FBF unit outputs 825, which correspond to the desired number of beams. Thus, the AEC outputs 815 (or the microphone outputs 800, if the AECs 810 are not included before the FBF units 820) are separated into a plurality of audio signals, enabling the device 110 to process audio data associated with a particular direction.

As illustrated in FIG. 8A, the number of microphone outputs 800/AEC outputs 815 and the number of FBF outputs 825 may not be the same. For example, FIG. 800 illustrates the microphone outputs 800 and the AEC outputs 815 using five arrows, whereas the FBF outputs 825 are illustrated using only three arrows. However, this is intended for illustrative purposes only, and the number of audio channels included in the microphone outputs 800 and/or the number of beams are typically factors of 2 (e.g., 2, 4, 6, 8, 12, etc.), although the disclosure is not limited thereto. For example, the microphone array 114 may include eight microphones whereas the device 110 may generate twelve beams. Additionally or alternatively, the number of audio channels included in the microphone outputs 800 and the number of beams may be the same without departing from the disclosure.

The FBF unit outputs 825 are input to adaptive noise cancellation (ANC) components 830. The ANC components 830 perform adaptive noise cancellation on the FBF unit outputs 825. For example, a first ANC component 830a may use a first FBF unit output 825a corresponding to a first direction as a target signal. The first ANC component 830a may estimate a noise reference signal using the remaining audio signals (e.g., audio signals not associated with the first direction, such as a second FBF unit output 825b corresponding to a second direction) and may subtract the noise reference signal from the first FBF unit output 825a. Thus, the output of the first ANC 825a corresponds to audio data associated with the first direction after noise and/or interference is cancelled from the other directions.

A number of ANC components included in the ANCs 830 may depend on the desired number of beams and/or the number of FBF unit outputs 825. For example, if there are twelve beams output by the FBF units 820, the device 110 may include twelve ANCs 830 configured to perform adaptive noise cancellation and generate twelve ANC outputs 835. However, the disclosure is not limited thereto and the number of ANC components included in the ANCs 830 may vary without departing from the disclosure.

While FIG. 8A illustrates the ANCs 830 receiving only the FBF unit outputs 825, the disclosure is not limited thereto. In some examples, the ANCs 830 may receive the AEC outputs 815 along with the FBF unit outputs 825 and may perform adaptive noise cancellation using both the AEC outputs 815 and the FBF unit outputs 825. For example, the device 110 may apply filter(s) to the AEC outputs 815 prior to performing adaptive noise cancellation.

The ANCs 830 may output the ANC outputs 835 to a signal-to-noise (SNR) beam selector 840. The SNR beam selector 840 may select one of the ANC outputs 835 as an output beam 845. For example, the SNR beam selector 840 may determine one or more signal quality metrics (e.g., SNR, power value, signal-to-noise plus interference ratio (SINR), and/or other signal quality metrics known to one of skill in the art) associated with each of the ANC outputs 835 and may select the ANC output having the highest signal quality metric as the output beam 845.

While FIG. 8A illustrates a plurality of ANCs 830 generating a plurality of ANC outputs 835 and the beam selector 840 selecting a single beam as the output audio data 845, the disclosure is not limited thereto. Instead, the device 110 may select the target signal(s) and the reference signal(s) prior to performing ANC and a single ANC 830 may subtract the reference signal(s) from the target signal(s) to generate the output audio data 845 without requiring the beam selector 840 without departing from the disclosure.

To improve the acoustic echo cancellation, FIG. 8B illustrates a system according to embodiments of the present disclosure. As illustrated in FIG. 8B, the AECs 810 may generate the reference signal based on loudspeaker canceling beam (LCB) audio data 850 instead of the playback audio data 805. For example, the device 110 may determine a loudspeaker canceling beam (LCB) (e.g., fixed beam directed to the loudspeaker(s) 116) and may use the LCB to generate the LCB audio data 850 that corresponds to the echo signal. The AECs 810 may subtract the reference signal (e.g., LCB audio data 850) from the target signal (e.g., individual audio channels of the microphone outputs 800) to generate the AEC outputs 815.

To generate the LCB, the system 100 may perform simulation(s) to generate a plurality of filter coefficient values corresponding to the loudspeaker(s) 116. These filter coefficient values correspond to the loudspeaker canceling beam and are determined based on the configuration of the microphone array 114 and/or the loudspeaker(s) 116 on the device 110. Thus, the filter coefficient values are fixed and the device 110 may generate LCB audio data using the same filter coefficient values over time. The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

The device 110 may generate the LCB audio data 850 by multiplying the filter coefficient values by a corresponding microphone signal (e.g., audio channel output by a microphone of the microphone array 114). For example, the device 110 may multiply a first portion of the microphone outputs 800 (e.g., first audio channel) corresponding to a first microphone of the microphone array 114 by a first filter coefficient value, multiply a second portion of the microphone outputs 800 (e.g., second audio channel) corresponding to a second microphone of the microphone array 114 by a second filter coefficient value, and so on.

After generating the LCB audio data 850, the device 110 may perform acoustic echo cancellation by subtracting the LCB audio data 850 (or at least a portion of the LCB audio data 850) from the microphone outputs 800 (e.g., input audio data). For example, the device 110 may perform first AEC processing to subtract the LCB audio data 850 from the first portion of the microphone outputs 800, may perform second AEC processing to subtract the LCB audio data 850 from the second portion of the microphone outputs 800, and so on. Thus, the device 110 may perform AEC processing based on a number of microphones included in the microphone array 114 (e.g., number of different output signals from the microphone array 114).

In some examples, the AECs 810 may generate the reference signal based on the LCB audio data 850 and the playback audio data 805. As illustrated in FIG. 8C, the AECs 810 may generate the reference signal based on the loudspeaker canceling beam (LCB) audio data 850 and the playback audio data 805. For example, the device 110 may determine a loudspeaker canceling beam (LCB) (e.g., fixed beam directed to the loudspeaker(s) 116) and may use the LCB to generate the LCB audio data 850. In some examples, the device 110 may combine the LCB audio data 850 and the playback audio data 805 to generate a reference signal. Thus, the AECs 810 may subtract the reference signal (e.g., LCB audio data 850 and the playback audio data 805) from the target signal (e.g., individual audio channels of the microphone outputs 800) to generate the AEC outputs 815. However, the disclosure is not limited thereto and in other examples, the AECs 810 may perform first AEC processing to subtract a first reference signal (e.g., the LCB audio data 850) from the target signal and generate a modified target signal and may perform second AEC processing to subtract a second reference signal (e.g., the playback audio data 805) from the modified target signal and generate the AEC output 815.

As discussed above, an adaptive beamformer (ABF) may include the FBFs 820 and the ANCs 830 and perform adaptive interference cancellation (AIC). Thus, while FIGS. 8A-8C illustrate the FBFs 820 and the ANCs 830 as separate components, the device 110 may include one or more ABFs that perform the same functionality as illustrated in FIGS. 8A-8C without departing from the disclosure.

Additionally or alternatively, while FIGS. 8A-8C illustrate the AECs 810 positioned before the FBFs XE20, the disclosure is not limited thereto. In some examples, the AECs 810 may be positioned after the fixed beamformer (FBF) units 820 without departing from the disclosure. For example, the LCB audio data 850 may be subtracted from the FBF outputs 825. Additionally or alternatively, the AECs 810 may be combined with the ANCs 830 in an adaptive beamformer (ABF) to perform adaptive interference cancellation (AIC) without departing from the disclosure.

Figure 9A:
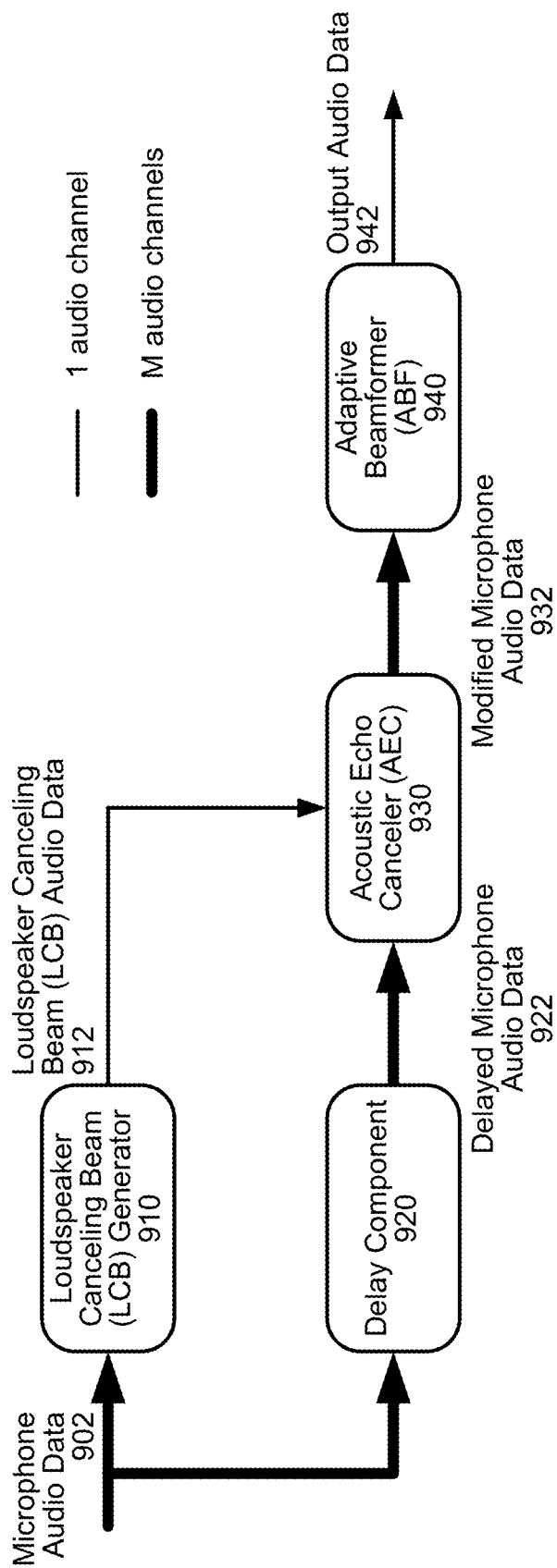
FIGS. 9A-9B illustrate examples of generating a loudspeaker canceling beam and using the loudspeaker canceling beam to perform echo cancellation according to embodiments of the present disclosure.
Figure 9B:
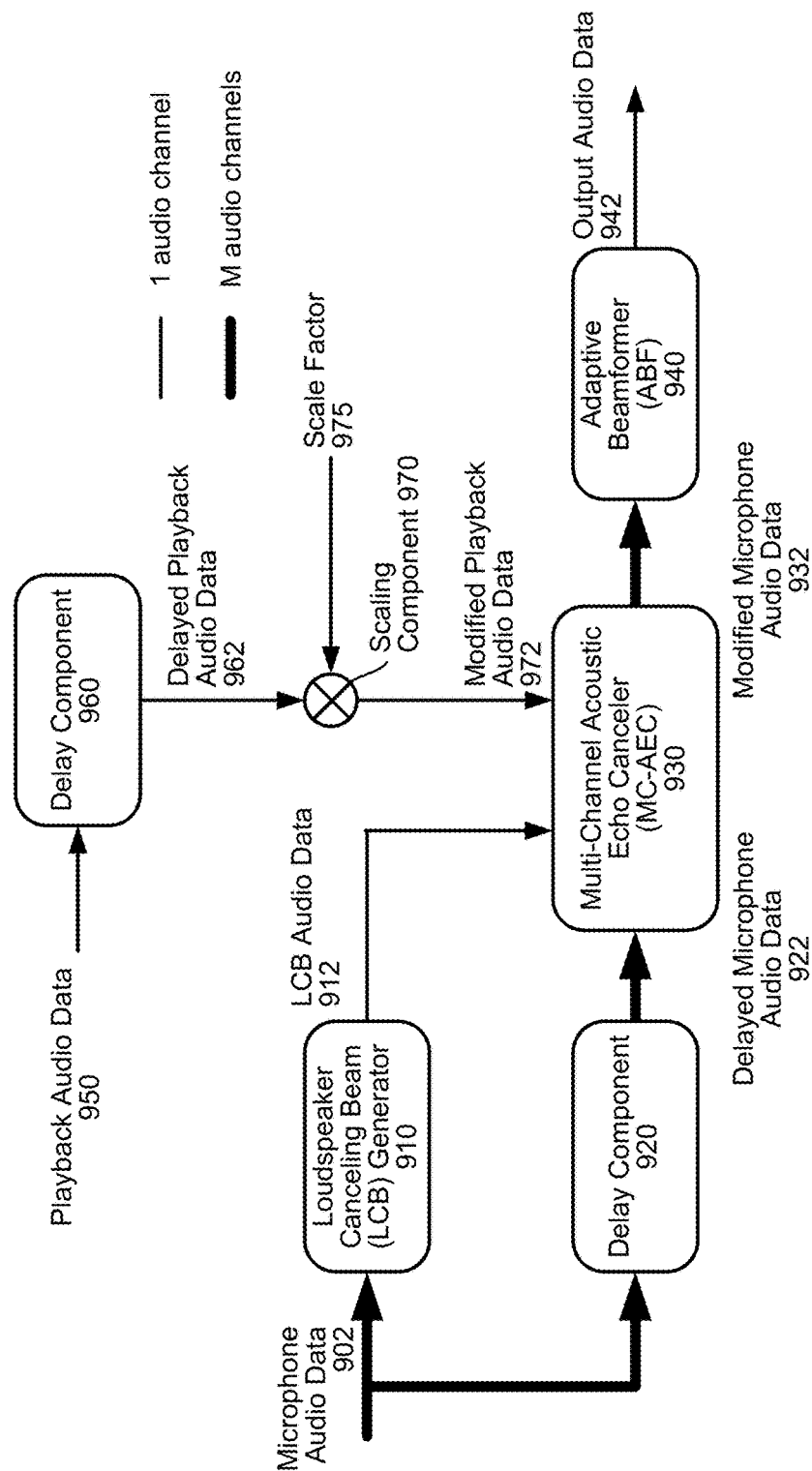

FIGS. 9A-9B illustrate examples of generating a loudspeaker canceling beam and using the loudspeaker canceling beam to perform echo cancellation according to embodiments of the present disclosure. For example, the device 110 may determine a loudspeaker canceling beam (LCB) (e.g., fixed beam directed to the loudspeaker(s) 116) and may use the LCB to generate LCB audio data that corresponds to the echo signal.

As illustrated in FIG. 9A, a loudspeaker canceling beam (LCB) generator 910 may receive microphone audio data 902 and may generate loudspeaker canceling beam (LCB) audio data 912. The LCB generator 910 may generate the LCB audio data 912 by multiplying filter coefficient values associated with the LCB by a corresponding microphone signal (e.g., microphone channel). For example, the LCB generator 910 may multiply a first portion of the microphone audio data 902 (e.g., first microphone channel) corresponding to a first microphone of the microphone array 114 by a first filter coefficient value, multiply a second portion of the microphone audio data 902 (e.g., second microphone channel) corresponding to a second microphone of the microphone array 114 by a second filter coefficient value, and so on.

The filter coefficients associated with the LCB may be calculated offline (e.g., prior to run-time) and stored in the device 110. For example, the system 100 may perform simulation(s), which will be described in greater detail below, to generate a plurality of filter coefficient values corresponding to the loudspeaker(s) 116. These filter coefficient values correspond to the loudspeaker canceling beam and are determined based on the configuration of the microphone array 114 and/or the loudspeaker(s) 116 on the device 110. Thus, the filter coefficient values are fixed and the LCB generator 910 may retrieve the filter coefficient values and may generate the LCB audio data 912 using the same filter coefficient values over time.

In addition to the LCB generator 910, a delay component 920 may also receive the microphone audio data 902 and may generate delayed microphone audio data 922. For example, the device 110 may determine a delay time associated with the LCB generator 910 and may generate the delayed microphone audio data 922 by delaying the microphone audio data 902 by the delay time.

The device 110 may determine the delay time using techniques known to one of skill in the art. For example, the device 110 may identify a first portion of the microphone audio data 902 associated with a first time and may determine that the first portion of the microphone audio data 902 corresponds to a first portion of the LCB audio data 912 associated with a second time. Thus, the device 110 may determine the delay time by determining a difference between the first time and the second time (e.g., subtracting the first time from the second time) and may generate the delayed microphone audio data 922 using the delay time.

After generating the LCB audio data 912 and the delayed microphone audio data 922, an acoustic echo canceller (AEC) component 930 may perform acoustic echo cancellation by subtracting the LCB audio data 912 (or at least a portion of the LCB audio data 912) from the delayed microphone audio data 922. For example, the AEC 930 may perform first AEC processing to subtract the LCB audio data 912 from a first portion of the delayed microphone audio data 922, may perform second AEC processing to subtract the LCB audio data 912 from a second portion of the delayed microphone audio data 922, and so on. Thus, the AEC 930 may perform AEC processing based on a number of microphones included in the microphone array 114 (e.g., number of different output signals from the microphone array 114). While FIG. 9A illustrates the AEC component 930 as a single component, the disclosure is not limited thereto and the AEC component 930 may include a plurality of AECs without departing from the disclosure.

By subtracting the LCB audio data 912, the AEC component 930 may subtract at least a portion of the echo signal from the delayed microphone audio data 922 to generate modified microphone audio data 932. Thus, the modified microphone audio data 932 may isolate first speech and include less distortion than the microphone audio data 902. However, in addition to the first speech, the modified microphone audio data 932 may still include a portion of the echo signal and/or may include other acoustic noise captured by the microphone array 114. For example, the modified microphone audio data 932 may remove a large portion of the echo signal generated by the loudspeaker(s) 116, but may not remove other echo signals generated by remote loudspeaker(s) (e.g., wireless loudspeaker(s) that also generate output audio based on playback audio data), other ambient acoustic noise in an environment around the device 110 (e.g., mechanical sounds, vibrations, crowd noise, etc.), and/or undesired speech (e.g., second speech generated by a different user at the same time).

To further isolate the first speech and/or improve the modified microphone audio data 932, the device 110 may input the modified microphone audio data 932 to an adaptive beamformer (ABF) 940 to perform adaptive interference cancellation using adaptive reference algorithm (ARA) processing. For example, the adaptive beamformer may generate a plurality of audio signals, determine one or more target signal(s) (e.g., by selecting or combining one or more of the plurality of audio signals), determine one or more reference signal(s) (e.g., by selecting or combining one or more of the plurality of audio signals), and generate output audio data 942 by subtracting at least a portion of the reference signal(s) from the target signal(s).

As illustrated in FIG. 9A, the microphone audio data 902 and the delayed microphone audio data 922 are represented by a thick line indicating that they correspond to M audio channels (e.g., number of microphones included in the microphone array 114, although the disclosure is not limited thereto). In contrast, the LCB audio data 912 corresponds to a single audio channel. Thus, AEC processing is performed for each of the M audio channels using the single audio channel of the LCB audio data 912.

In addition, FIG. 9A illustrates the ABF 940 receiving the M audio channels and generating the output audio data 942 corresponding to a single audio channel. As discussed above with regard to FIGS. 8A-8C, the ABF 940 may include a plurality of fixed beamformers (FBFs) and adaptive noise cancellers (ANCs). Thus, the ABF 940 may perform beamforming to generate a plurality of audio signals corresponding to different directions and the number of beams may be different than the number of microphones. In some examples, the ABF 940 may perform adaptive noise cancellation a single time to generate the output audio data 942. For example, the ABF 940 may select target signal(s) and reference signal(s) and may perform adaptive noise cancellation to subtract the reference signal(s) from the target signal(s) to generate the output audio data 942. However, the disclosure is not limited thereto, and in other examples the ABF 940 may perform adaptive noise cancellation a number of times to generate a plurality of output signals and then may select a single output signal as the output audio data 942 without departing from the disclosure.

While the process of beamforming performed by the ABF 940 is similar to generating the LCB audio data 912 the ABF 940 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the ABF 940 may select the target signal(s) by detecting speech, based on signal strength values (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the ABF 940 may identify the reference signal(s) based on the signal strength values and/or using other inputs without departing from the disclosure. Thus, the target signal(s) and/or the reference signal(s) selected by the ABF 940 may vary, resulting in different filter coefficient values over time. In contrast, the filter coefficient values associated with the LCB are static.

In some examples, the device 110 may generate the reference signal based on the LCB audio data 912 and playback audio data. FIG. 9B illustrates an example of performing acoustic echo cancellation using the loudspeaker canceling beam audio data and playback audio data according to embodiments of the present disclosure. As illustrated in FIG. 9B, playback audio data 950 may be input to a delay component 960 to generate delayed playback audio data 962, using techniques similar to those described above with regard to the delay component 920. For example, the delay component 960 may generate the delayed playback audio data 962 by delaying the playback audio data 950 based on the delay time.

In addition to delaying the playback audio data 950 to synchronize the playback audio data 950 with the LCB audio data 912, the device 110 may scale the playback audio data 950 by a scale factor 970 based on an average power or average energy of the LCB audio data 912. For example, the device 110 may determine a scale factor 975 based on a first average power value of the delayed playback audio data 962 and a second average power value of the LCB audio data 912 and a scaling component 970 may generate modified playback audio data 972 based on the delayed playback audio data 962 and the scale factor 975. Thus, the modified playback audio data 972 may be synchronized and normalized based on the LCB audio data 912.

To perform AEC processing with the modified playback audio data, FIG. 9B illustrates a multi-channel AEC (MC-AEC) 930, which is capable of performing AEC for a single channel (e.g., one speaker) or for multiple channels (e.g., 5.1 surround sound) without departing from the disclosure. The MC-AEC component 930 may generate one or more reference signals based on the LCB audio data 912 and the modified playback audio data 972. For example, the MC-AEC component 930 may combine the LCB audio data 912 and the modified playback audio data 972 to generate a reference signal. Thus, the MC-AEC component 930 may subtract the reference signal (e.g., LCB audio data 912 and the modified playback audio data 972) from the target signal (e.g., individual audio channels of the delayed microphone audio data 922) to generate the modified microphone audio data 932. However, the disclosure is not limited thereto and in other examples, the MC-AEC component 930 may perform first AEC processing to subtract a first reference signal (e.g., the LCB audio data 912) from the target signal to generate a modified target signal and may perform second AEC processing to subtract a second reference signal (e.g., the modified playback audio data 972) from the modified target signal to generate the modified microphone audio data 932.

Additionally or alternatively, the MC-AEC component 930 may perform AEC processing separately for each channel of the modified playback audio data 972 without departing from the disclosure. For example, the second AEC processing may subtract a second reference signal (e.g., first channel of the modified playback audio data 972) and the MC-AEC component 930 may perform third AEC processing to subtract a third reference signal (e.g., second channel of the modified playback audio data 972), such as when the modified playback audio data 972 corresponds to stereo (e.g., two channel) audio. Thus, the MC-AEC component 930 may generate a combined reference signal for all channels of the modified playback audio data 972 and/or the LCB audio data 912 or may generate a plurality of reference signals (e.g., one for each channel of the modified playback audio data 972 and/or the LCB audio data 912) without departing from the disclosure.

FIGS. 9A-9B illustrate the device 110 generating the LCB audio data and performing AEC processing in the time domain. For example, the device 110 may apply filter coefficient values g(t) in the time domain to the microphone audio data 902 to generate the LCB audio data 912 and may perform acoustic echo cancellation in the time domain to generate the modified microphone audio data 932. However, the disclosure is not limited thereto. Instead, the device 110 may receive first input audio data in the time domain and may perform Fast Fourier Transform (FFT) processing on the first input audio data to generate second input audio data in the frequency domain (e.g., microphone audio data 902). The device 110 may then apply filter coefficient values g(ω) in the frequency domain to the second input audio data to generate the LCB audio data 912 and may perform acoustic echo cancellation in the frequency domain to generate first modified input audio data. After performing the AEC, the device 110 may perform Inverse Fast Fourier Transform (IFFT) processing on the first modified input audio data to generate second modified input audio data in the time domain (e.g., modified microphone audio data 932). Thus, the device 110 may generate the LCB audio data 912 and perform acoustic echo cancellation in the time domain and/or the frequency domain without departing from the disclosure. If the device 110 were to operate in the frequency domain, FIGS. 9A-9B would include an FFT processing component to generate the microphone audio data 902 and an IFFT processing component to generate the modified microphone audio data 932.

Additionally or alternatively, the device 110 may generate the LCB audio data 912 and perform acoustic echo cancellation in a subband domain without departing from the disclosure. For example, the device 110 may separate different frequency ranges (e.g., subbands) and may generate the LCB audio data and/or perform acoustic echo cancellation differently for each frequency range without departing from the disclosure. The device 110 may operate in the subband domain similarly to the description above about operating in the frequency domain, except the FFT/IFFT processing would be applied to each of the individual frequency ranges separately.

Figure 10A:
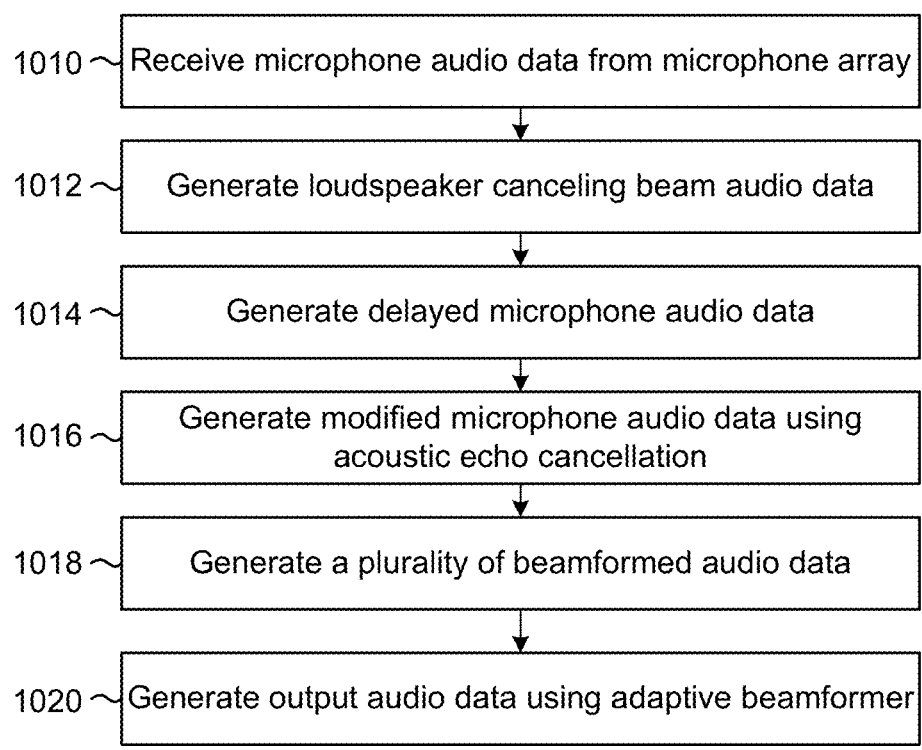
FIGS. 10A-10B are flowcharts conceptually illustrating example methods for generating output audio based on a loudspeaker canceling beam according to embodiments of the present disclosure.
Figure 10B:
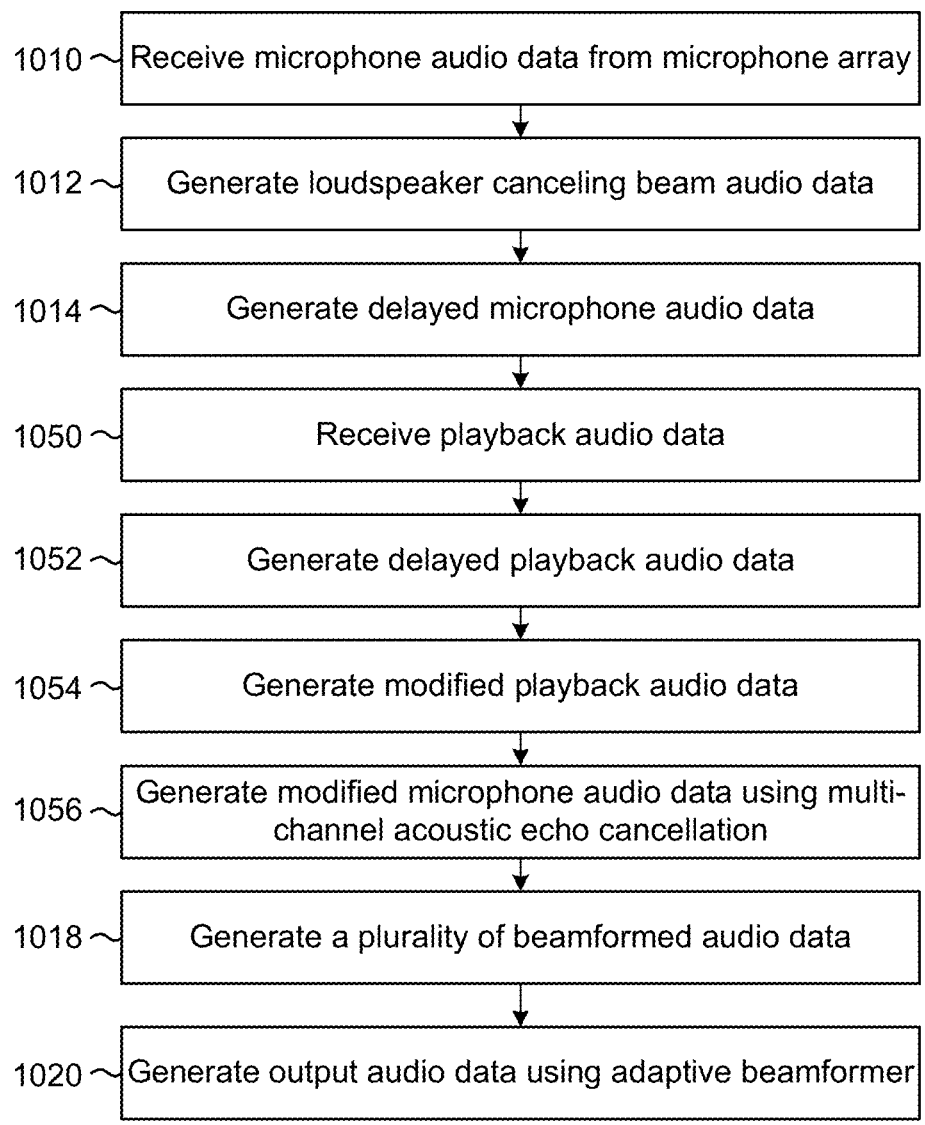

FIGS. 10A-10B are flowcharts conceptually illustrating example methods for generating output audio based on a loudspeaker canceling beam according to embodiments of the present disclosure. As illustrated in FIG. 10A, the device 110 may receive (1010) microphone audio data corresponding to audio captured by the microphone array 114 and may generate (1012) loudspeaker canceling beam (LCB) audio data using filter coefficient values associated with the LCB. For example, the device 110 may generate the LCB audio data by multiplying the filter coefficient values by a corresponding microphone signal (e.g., portion of the microphone audio data associated with an individual microphone). For example, the device 110 may multiply a first portion of the microphone audio data (e.g., first microphone channel) corresponding to a first microphone of the microphone array 114 by a first filter coefficient value, multiply a second portion of the microphone audio data (e.g., second microphone channel) corresponding to a second microphone of the microphone array 114 by a second filter coefficient value, and so on.

The device 110 may generate (1014) delayed microphone audio data by delaying the microphone audio data based on the LCB audio data. For example, the device 110 may determine a delay time associated with the LCB audio data and may generate the delayed microphone audio data by delaying the microphone audio data by the delay time.

The device 110 may determine the delay time using techniques known to one of skill in the art. For example, the device 110 may identify a first portion of the microphone audio data associated with a first time and may determine that the first portion of the microphone audio data corresponds to a first portion of the LCB audio data associated with a second time. Thus, the device 110 may determine the delay time by determining a difference between the first time and the second time (e.g., subtracting the first time from the second time) and may generate the delayed microphone audio data using the delay time.

The device 110 may generate (1016) modified microphone audio data using acoustic echo cancellation processing. For example, the device 110 may perform acoustic echo cancellation to subtract at least a portion of the LCB audio data from the delayed microphone audio data to generate the modified microphone audio data.

The device 110 may perform acoustic echo cancellation separately for each microphone included in the microphone array 114. Thus, the device 110 may subtract at least a portion of the LCB audio data from each microphone channel, although the disclosure is not limited thereto. For example, the device 110 may perform first AEC processing to subtract the LCB audio data from a first portion of the delayed microphone audio data, may perform second AEC processing to subtract the LCB audio data from a second portion of the delayed microphone audio data, and so on.

By subtracting the LCB audio data, the device 110 may subtract at least a portion of the echo signal from the delayed microphone audio data to generate modified microphone audio data. Thus, the modified microphone audio data may isolate first speech and include less distortion than the microphone audio data. However, in addition to the first speech, the modified microphone audio data may still include a portion of the echo signal and/or may include other acoustic noise captured by the microphone array 114. For example, the modified microphone audio data may remove a large portion of the echo signal generated by the loudspeaker(s) 116, but may not remove other echo signals generated by remote loudspeaker(s) (e.g., wireless loudspeaker(s) that also generate output audio based on playback audio data), other ambient acoustic noise in an environment around the device 110 (e.g., mechanical sounds, vibrations, crowd noise, etc.), and/or undesired speech (e.g., second speech generated by a different user at the same time).

The device 110 may generate (1018) a plurality of beamformed audio data and may generate (1020) output audio data using an adaptive beamformer. For example, the device 110 may beamform the modified microphone audio data into a plurality of beams (e.g., perform a beamforming operation to generate beamformed audio data). As used herein, the term beam may refer to particular audio data corresponding to the modified microphone audio data that was captured by the microphone array, where the particular audio data of a beam corresponds to a particular direction. Thus, each beam may include audio data corresponding to a particular direction relative to the device 110. So adaptive beamformer may divide the modified microphone audio data into different beams of audio data, each corresponding to a direction.

To generate the output audio data, the device 110 may determine a target signal, determine a reference signal, and generate the output audio data based on the target signal and the reference signal. For example, the device 110 may select first beamformed audio data as the target signal, may select second beamformed audio data as the reference signal, and may generate the output audio data by subtracting at least a portion of the second beamformed audio data from the first beamformed audio data. However, the disclosure is not limited thereto and the device 110 may determine one or more target signal(s) and/or one or more reference signal(s) without departing from the disclosure.

In some examples, the device 110 may generate perform acoustic echo cancellation the LCB audio data and playback audio data. As illustrated in FIG. 10B, the device 110 may perform steps 1010-1014 to generate the loudspeaker canceling beam audio data and the delayed microphone audio data. In addition, the device 110 may receive (1050) playback audio data, may generate (1052) delayed playback audio data based on a delay time and may generate (1054) modified playback audio data by scaling the delayed playback audio data to be similar to the LCB audio data.

For example, the playback audio data may be input to a delay component to generate delayed playback audio data, using techniques similar to those described above with regard to generating the delayed microphone audio data. For example, the delay component may generate the delayed playback audio data by delaying the playback audio data based on the delay time associated with the LCB audio data.

In addition to delaying the playback audio data to synchronize the playback audio data with the LCB audio data, the device 110 may scale the playback audio data by a scale factor based on an average power or average energy of the LCB audio data. For example, the device 110 may determine a scale factor based on a first average power value of the delayed playback audio data and a second average power value of the LCB audio data and may generate the modified playback audio data based on the delayed playback audio data and the scale factor. Thus, the modified playback audio data may be synchronized and normalized based on the LCB audio data.

The device 110 may generate (1056) the modified microphone audio data using multi-channel acoustic echo cancellation processing based on the LCB audio data and the modified playback audio data. For example, the device 110 may perform acoustic echo cancellation to subtract at least a portion of at least one of the LCB audio data or the modified playback audio data from the delayed microphone audio data to generate the modified microphone audio data.

In some examples, the device 110 may generate a reference signal based on the LCB audio data and the modified playback audio data. For example, the device 110 may combine the LCB audio data and the modified playback audio data to generate a reference signal. Thus, the device 110 may subtract the reference signal (e.g., LCB audio data and the modified playback audio data) from the target signal (e.g., individual audio channels of the delayed microphone audio data) to generate the modified microphone audio data. However, the disclosure is not limited thereto and in other examples, the device 110 may perform first AEC processing to subtract a first reference signal (e.g., the LCB audio data) from the target signal to generate a modified target signal and may perform second AEC processing to subtract a second reference signal (e.g., the modified playback audio data) from the modified target signal to generate the modified microphone audio data.

Additionally or alternatively, the device 110 may perform AEC processing separately for each channel of the modified playback audio data 972 without departing from the disclosure. For example, the second AEC processing may subtract a second reference signal (e.g., first channel of the modified playback audio data 972) and the device 110 may perform third AEC processing to subtract a third reference signal (e.g., second channel of the modified playback audio data 972), such as when the modified playback audio data 972 corresponds to stereo (e.g., two channel) audio. Thus, the device 110 may generate a combined reference signal for all channels of the modified playback audio data 972 and/or the LCB audio data 912 or may generate a plurality of reference signals (e.g., one for each channel of the modified playback audio data 972 and/or the LCB audio data 912) without departing from the disclosure.

FIGS. 10A-10B illustrate the device 110 generating the LCB audio data and performing AEC processing in the time domain. For example, the device 110 may apply filter coefficient values g(t) in the time domain to the microphone audio data to generate the LCB audio data and may perform acoustic echo cancellation in the time domain to generate the modified microphone audio data. However, the disclosure is not limited thereto. Instead, the device 110 may receive first input audio data in the time domain and may perform Fast Fourier Transform (FFT) processing on the first input audio data to generate second input audio data in the frequency domain (e.g., microphone audio data). The device 110 may then apply filter coefficient values g($\omega$) in the frequency domain to the second input audio data to generate the LCB audio data and may perform acoustic echo cancellation in the frequency domain to generate first modified input audio data. After performing the AEC, the device 110 may perform Inverse Fast Fourier Transform (IFFT) processing on the first modified input audio data to generate second modified input audio data in the time domain (e.g., modified microphone audio data). Thus, the device 110 may generate the LCB audio data and perform acoustic echo cancellation in the time domain and/or the frequency domain without departing from the disclosure. If the device 110 were to operate in the frequency domain, FIGS. 10A-10B would include an FFT processing step to generate the microphone audio data and an IFFT processing step to generate the modified microphone audio data.

Additionally or alternatively, the device 110 may generate the LCB audio data and perform acoustic echo cancellation in a subband domain without departing from the disclosure. For example, the device 110 may separate different frequency ranges (e.g., subbands) and may generate the LCB audio data and/or perform acoustic echo cancellation differently for each frequency range without departing from the disclosure. The device 110 may operate in the subband domain similarly to the description above about operating in the frequency domain, except the FFT/IFFT processing would be applied to each of the individual frequency ranges separately.

Figure 11:
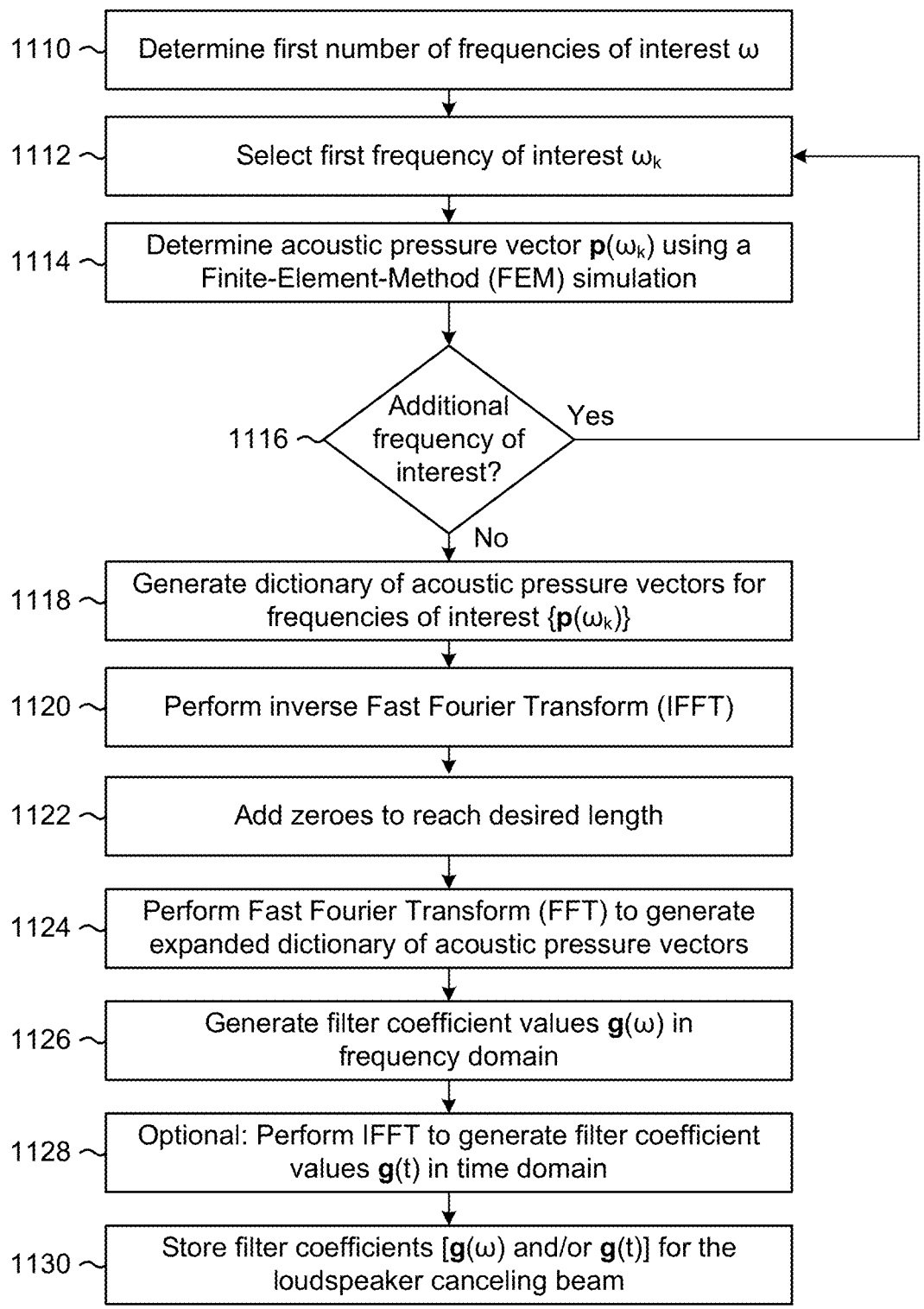
FIG. 11 is a flowchart conceptually illustrating an example method for determining filter coefficient values associated with the loudspeaker canceling beam according to embodiments of the present disclosure.

FIG. 11 is a flowchart conceptually illustrating an example method for determining filter coefficient values associated with the loudspeaker canceling beam according to embodiments of the present disclosure. Instead of corresponding to a direction pointing away from the device 110 (e.g., 360 degrees around the device 110), the loudspeaker canceling beam corresponds to a direction pointing from the microphone array 114 to the loudspeaker(s) 116. Thus, the loudspeaker canceling beam is fixed, with static filter coefficients that are calculated offline based on a configuration of the device 110.

The system 100 may calculate the filter coefficients associated with the LCB offline (e.g., prior to run-time) and store the filter coefficients in the device 110. For example, the system 100 may perform simulation(s) to generate a plurality of filter coefficient values corresponding to the loudspeaker(s) 116. These filter coefficient values correspond to the loudspeaker canceling beam and are determined based on the configuration of the microphone array 114 and/or the loudspeaker(s) 116 on the device 110. Thus, the filter coefficient values are fixed and the device 110 may retrieve the filter coefficient values and may generate the LCB audio data using the same filter coefficient values over time.

The system 100 may generate the loudspeaker canceling beam towards the loudspeaker(s) 116 included in the device 110 (e.g., not to wireless loudspeakers or other remote loudspeakers), such that the loudspeaker canceling beam amplifies the signal from the loudspeaker(s) 116 while attenuating signals from other directions (e.g., target signal(s) corresponding to desired speech).

To properly design the LCB, the system 100 may compute a transfer function of an acoustic path from just outside the loudspeaker(s) 116 to all of the microphones included in the microphone array 114. However, the transfer function of the loudspeaker(s) 116 itself is not included because it does not have a geometrical meaning and could change with loudspeaker nonlinearity. Conventional techniques may calculate the transfer function using physical measurements in an anechoic room by playing white noise through the loudspeaker(s) 116 and recording (1) the signal just outside the loudspeaker(s) 116 using an external microphone and (2) the signal at all microphones in the microphone array 114. However, this approach may suffer from measurement error and requires multiple measurements at different positions for the external microphone in order to characterize an omnidirectional loudspeaker.

In contrast to calculating the transfer function using physical measurements, the system 100 may perform simulation(s) that rely on solving the acoustic wave equation using Finite-Element-Method (FEM) techniques, Finite-Difference-Method (FDM) techniques, and/or other techniques known to one of skill in the art. Instead of solving the time-domain acoustic wave equation, the system 100 may solve an inhomogeneous Helmoholtz equation (e.g., frequency-domain equivalent of the acoustic wave equation) at all frequencies of interest.

To perform the simulations, the system 100 may model a surface of the device as a hard acoustic boundary and may model an omnidirectional loudspeaker as a line source on the surface of the device at a position of the loudspeaker. If the loudspeaker is not omnidirectional, then the system 100 may model the loudspeaker as a line source that is segmented with smaller line segments, and the radiation from each segment is proportional to the loudspeaker radiation pattern at this angle. However, the disclosure is not limited thereto and the system 100 may model the loudspeaker using any technique known to one of skill in the art without departing from the disclosure. In addition, the system 100 may model each of the microphones as a point receiver. If the surface area of the microphone is large relative to the wavelength (e.g., frequency of interest), the microphone response is evaluated by integrating the acoustic pressure over the area. However, the disclosure is not limited thereto and other types of modeling for the microphone surface could also be included.

By performing a simulation to solve the inhomogeneous Helmoholtz equation at a frequency of interest $\omega k$, the system 100 may determine an acoustic pressure value (e.g., $p(\omega k)$) associated with each microphone in the microphone array 114 at the frequency of interest $\omega k$. For example, the output of each simulation is an acoustic pressure vector (e.g., $p(\omega k)$) that includes complex values, has a length equal to a size of the microphone array 114, and contains the acoustic pressure values at each microphone for the frequency of interest $\omega k$.

The system 100 may perform multiple simulations to solve the inhomogeneous Helmoholtz equation at each frequency of interest $\omega k$ and may build a dictionary of acoustic pressure vectors $\{p(\omega k)\}$ that includes each of the acoustic pressure vectors $p(\omega k)$ associated with a frequency of interest $\omega k$. For example, the system 100 may determine an acoustic pressure vector for 256 different frequencies of interest in the range from 0 kHz to 8 kHz, although the disclosure is not limited thereto.

The system 100 may determine the time-domain filter for the loudspeaker canceling beam (LCB) (e.g., $g(t)$) based on the dictionary of acoustic pressure values $\{p(\omega k)\}$ using standard minimum variance distortionless response (MVDR) techniques for wideband beamforming of microphone arrays. The MVDR filter order is typically longer than the number of simulated frequency bins (e.g., frequencies of interest wk), so the system 100 may interpolate the simulated impulse responses (e.g., dictionary of acoustic pressure values $\{p(\omega k)\}$) to a higher-resolution frequency grid by performing an Inverse Fast Fourier Transform (IFFT) of the simulated impulse responses, padding by zeroes to the required length associated with the MVDR filter order, and performing a Fast Fourier Transform (FFT) of the padded sequence. Thus, the system 100 may generate the filter coefficients associated with the loudspeaker canceling beam.

As illustrated in FIG. 11, the system 100 may determine (1110) a first number of frequencies of interest $\omega$, may select (1112) a first frequency of interest $\omega k$, and may determine (1114) an acoustic pressure vector $p(\omega k)$ using a Finite-Element-Method (FEM) simulation. For example, the system 100 may determine an inhomogeneous Helmoholtz equation associated with the first frequency of interest $\omega k$ and may solve the inhomogeneous Helmoholtz equation using the FEM techniques to generate a first vector of acoustic pressure values associated with the first frequency of interest ωk. While FIG. 11 illustrates determining the acoustic pressure vector p(ωk) using the FEM simulation, the disclosure is not limited thereto and the system 100 may determine the acoustic pressure vector p(ωk) using FEM techniques, Finite-Difference-Method (FDM) techniques, and/or other techniques known to one of skill in the art.

The system 100 may determine (1116) if there is an additional frequency of interest and, if so, may loop to step 1112 and repeat steps 1112-1114 for the additional frequency of interest. If there are no additional frequencies of interest, the system 100 may generate (1118) a dictionary of acoustic pressure vectors {p(ωk)} associated with the frequencies of interest and may determine the filter coefficients based on the dictionary of acoustic pressure vectors {p(ωk)}.

The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure. For example, the filter coefficient values may be determined using an MVDR filter or the like. However, the MVDR filter order is typically longer than the number of simulated frequency bins (e.g., filter order exceeds the number of frequencies of interest, meaning the dictionary of acoustic pressure vectors {p(ωk)} is not large enough).

To generate the filter coefficient values, the system 100 may interpolate the dictionary of acoustic pressure vectors {p(ωk)} (e.g., simulated impulse responses) to a higher frequency grid. For example, the dictionary of acoustic pressure vectors {p(ωk)} may correspond to first data and the system 100 may perform (1120) Inverse Fast Fourier Transform (IFFT) processing on the first data to generate second data, may add (1122) zeroes to the second data to reach the required length (e.g., MVDR filter order), and may perform (1124) Fast Fourier Transform (FFT) processing to generate an expanded dictionary of acoustic pressure vectors {p(ωk)} (e.g., the dictionary of acoustic pressure vectors padded with zeroes to have a length equal to the MVDR filter order).

Once a length of the expanded dictionary of acoustic pressure vectors {p(ωk)} is equal to the MVDR filter order, the system 100 may generate (1126) the filter coefficients g(ω) in the frequency domain based on the expanded dictionary of acoustic pressure vectors {p(ωk)}. As discussed above, the system 100 may generate the filter coefficients g(ω) using MVDR techniques, although the disclosure is not limited thereto. The system 100 may optionally perform (1128) IFFT processing to generate filter coefficient values g(t) in the time domain. The system 100 may store (1130) the filter coefficients [g(ω) and/or g(t)] for the loudspeaker canceling beam. In some examples, the system 100 may generate the LCB audio data and perform acoustic echo cancellation in the time domain, and therefore the system 100 may store the filter coefficients g(t) in the time domain. In other examples, the system 100 may generate the LCB audio data and perform acoustic echo cancellation in the frequency domain, and therefore the system 100 may store the filter coefficients g(ω) in the frequency domain. However, the disclosure is not limited thereto and the system 100 may store the filter coefficients g(ω) in the frequency domain and/or the filter coefficients g(t) in the time domain without departing from the disclosure.

Figure 12:
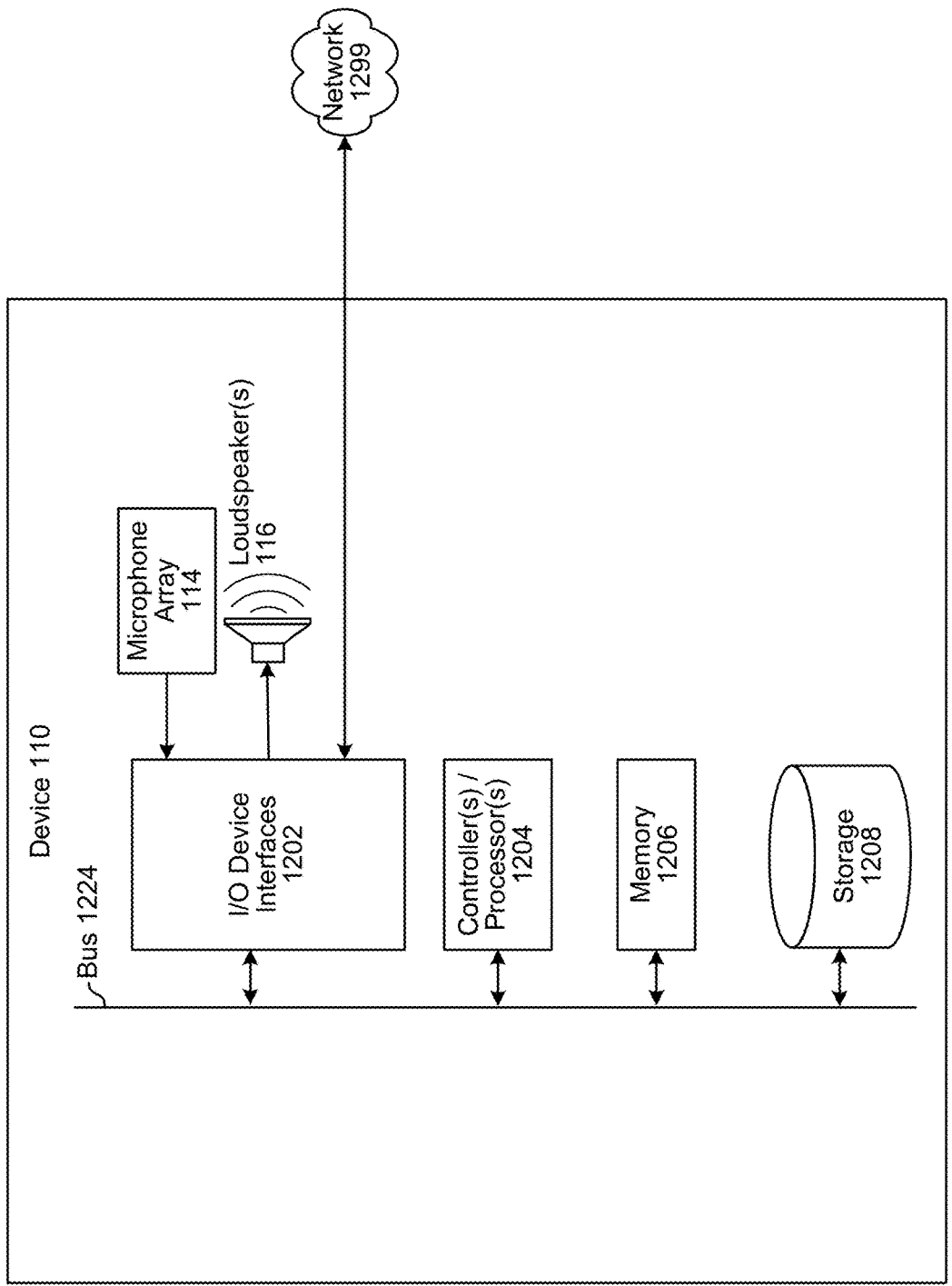
FIG. 12 is a block diagram conceptually illustrating example components of a device according to embodiments of the present disclosure.

FIG. 12 is a block diagram conceptually illustrating example components of the device 110. In operation, the device 110 may include computer-readable and computer-executable instructions that reside on the device, as will be discussed further below.

The device 110 may include one or more audio capture device(s), such as a microphone array 114 which may include a plurality of microphones 502. The audio capture device(s) may be integrated into a single device or may be separate.

The device 110 may also include an audio output device for producing sound, such as loudspeaker(s) 116. The audio output device may be integrated into a single device or may be separate.

The device 110 may include an address/data bus 1224 for conveying data among components of the device 110. Each component within the device may also be directly connected to other components in addition to (or instead of) being connected to other components across the bus 1224.

The device 110 may include one or more controllers/processors 1204, that may each include a central processing unit (CPU) for processing data and computer-readable instructions, and a memory 1206 for storing data and instructions. The memory 1206 may include volatile random access memory (RAM), non-volatile read only memory (ROM), non-volatile magnetoresistive (MRAM) and/or other types of memory. The device 110 may also include a data storage component 1208, for storing data and controller/processor-executable instructions (e.g., instructions to perform operations discussed herein). The data storage component 1208 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1202.

Computer instructions for operating the device 110 and its various components may be executed by the controller(s)/processor(s) 1204, using the memory 1206 as temporary "working" storage at runtime. The computer instructions may be stored in a non-transitory manner in non-volatile memory 1206, storage 1208, or an external device. Alternatively, some or all of the executable instructions may be embedded in hardware or firmware in addition to or instead of software.

The device 110 may include input/output device interfaces 1202. A variety of components may be connected through the input/output device interfaces 1202, such as the microphone array 114, the loudspeaker(s) 116, and a media source such as a digital media player (not illustrated). The input/output interfaces 1202 may include A/D converters (not illustrated) and/or D/A converters (not illustrated).

The input/output device interfaces 1202 may also include an interface for an external peripheral device connection such as universal serial bus (USB), FireWire, Thunderbolt or other connection protocol. The input/output device interfaces 1202 may also include a connection to one or more networks 1299 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1299, the device 110 may be distributed across a networked environment.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system. For example, certain components such as an FBF unit 440 (including filter and sum component 430) and adaptive noise canceller (ANC) unit 460 may be arranged as illustrated or may be arranged in a different manner, or removed entirely and/or joined with other non-illustrated components.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the adaptive noise canceller (ANC) unit 460, adaptive beamformer (ABF) unit 490, etc. may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   sending playback audio data to a loudspeaker of a device to generate playback audio;
   capturing, by a first microphone of the device, first microphone audio data including (i) a first representation of speech, (ii) a first representation of the playback audio, and (iii) a first representation of an acoustic noise generated by a noise source;
   capturing, by a second microphone of the device, second microphone audio data including (i) a second representation of the speech, (ii) a second representation of the playback audio, and (iii) a second representation of the acoustic noise;
   generating, based on the first microphone audio data and the second microphone audio data, loudspeaker audio data corresponding to the loudspeaker, the loudspeaker audio data including a third representation of the playback audio;
   generating, based on the first microphone audio data and the loudspeaker audio data, first modified audio data including a third representation of the speech and a third representation of the acoustic noise;
   generating, based on the second microphone audio data and the loudspeaker audio data, second modified audio data including a fourth representation of the speech and a fourth representation of the acoustic noise;
   generating, based on the first modified audio data and the second modified audio data, first beamformed audio data corresponding to at least a first direction, the first beamformed audio data including a fifth representation of the speech;
   generating, based on the first modified audio data and the second modified audio data, second beamformed audio data corresponding to at least a second direction, the second beamformed audio data including a fifth representation of the acoustic noise; and
   generating output audio data by subtracting at least a portion of the second beamformed audio data from the first beamformed audio data, the output audio data including a sixth representation of the speech.

2. The computer-implemented method of claim 1, further comprising:
   delaying the playback audio data to generate modified playback audio data that is synchronized with the loudspeaker audio data, wherein:
   generating the first modified audio data further comprises generating the first modified audio data using the modified playback audio data, and
   generating the second modified audio data further comprises generating the second modified audio data using the modified playback audio data.

3. The computer-implemented method of claim 1, further comprising:
   determining an inhomogeneous Helmoholtz equation associated with a first frequency;
   solving the inhomogeneous Helmoholtz equation using Finite-Element-Method (FEM) techniques to generate a first vector of acoustic pressure values associated with the first frequency, wherein:
   the loudspeaker is modeled as a line source,
   the first microphone is modeled as a first point receiver,
   the second microphone is modeled as a second point receiver,
   the first vector includes a first acoustic pressure value associated with the first microphone at the first frequency, and
   the first vector includes a second acoustic pressure value associated with the second microphone at the first frequency.

4. The computer-implemented method of claim 1, further comprising:
   generating a first acoustic pressure vector including at least a first acoustic pressure value associated with the first microphone at a first frequency and a second acoustic pressure value associated with the second microphone at the first frequency;
   generating a second acoustic pressure vector including at least a third acoustic pressure value associated with the first microphone at a second frequency and a fourth acoustic pressure value associated with the second microphone at the second frequency;

generating first data including the first acoustic pressure vector and the second acoustic pressure vector;

performing an inverse Fast Fourier Transform on the first data to generate second data;

determining a first value corresponding to a minimum variance distortionless response (MVDR) filter order used to generate filter coefficient values;

determining a second value corresponding to a number of acoustic pressure vectors included in the first data;

determining a third value by subtracting the second value from the first value;

generating third data by padding the second data with zeros based on the third value;

performing a Fast Fourier Transform on the third data to generate fourth data; and determining the filter coefficient values corresponding to the MVDR filter using the fourth data.

5. A computer-implemented method, the method comprising:

receiving first audio data associated with a first microphone;

receiving second audio data associated with a second microphone;

determining a first filter coefficient value corresponding to at least one loudspeaker, the first filter coefficient value associated with the first microphone;

determining a second filter coefficient value corresponding to the at least one loudspeaker, the second filter coefficient value associated with the second microphone;

generating a first portion of third audio data based on the first audio data and the first filter coefficient value, the third audio data including a first representation of first acoustic noise generated by the at least one loudspeaker;

generating a second portion of the third audio data based on the second audio data and the second filter coefficient value;

generating fourth audio data by subtracting at least a portion of the third audio data from the first audio data; and generating fifth audio data by subtracting at least a portion of the third audio data from the second audio data.

6. The computer-implemented method of claim 5, further comprising:

determining, using one or more beamformers based on the fourth audio data and the fifth audio data, a plurality of audio signals comprising:
a first audio signal corresponding to a first direction, and
a second audio signal corresponding to a second direction;

determining that the first audio signal includes a first representation of speech;

determining that the second audio signal includes a first representation of second acoustic noise generated by a noise source; and generating sixth audio data by subtracting at least a portion of the second audio signal from the first audio signal, the sixth audio data including a second representation of the speech.

7. The computer-implemented method of claim 5, further comprising:

determining a first plurality of coefficient values associated with a first direction, wherein the first plurality of coefficient values correspond to a first linear filter used by one or more beamformers, the first plurality of coefficient values including a first coefficient value corresponding to the first microphone and a second coefficient value corresponding to the second microphone;

generating a first portion of a first audio signal by multiplying the fourth audio data by the first coefficient value;

generating a second portion of the first audio signal by multiplying the fifth audio data by the second coefficient value;

determining a second plurality of coefficient values associated with a second direction, wherein the second plurality of coefficient values correspond to a second linear filter used by the one or more beamformers, the second plurality of coefficient values including a third coefficient value corresponding to the first microphone and a fourth coefficient value corresponding to the second microphone;

generating a first portion of a second audio signal by multiplying the fourth audio data by the third coefficient value; and generating a second portion of the second audio signal by multiplying the fifth audio data by the second coefficient value.

8. The computer-implemented method of claim 5, further comprising:

generating playback audio data that is synchronized with the third audio data, wherein:
generating the fourth audio data further comprises subtracting at least a portion of at least one of the third audio data or the playback audio data from the first audio data, and
generating the fifth audio data further comprises subtracting a portion of one of the third audio data or the playback audio data from the second audio data.

9. The computer-implemented method of claim 5, further comprising:

determining that a first portion of the first audio data is received at a first time;

determining that a first portion of the third audio data is received at a second time, the first portion of the third audio data corresponding to the first portion of the first audio data;

determining a delay value between the first time and the second time; and generating the fourth audio data by subtracting at least the first portion of the third audio data from the first audio data, wherein the first audio data is synchronized with the third audio data based on the delay value.

10. The computer-implemented method of claim 5, further comprising:

determining an inhomogeneous Helmoholtz equation associated with a first frequency;

solving the inhomogeneous Helmoholtz equation to generate a first vector of acoustic pressure values associated with the first frequency, wherein:
the first microphone is modeled as a first point receiver,
the second microphone is modeled as a second point receiver,
the first vector includes a first acoustic pressure value associated with the first microphone at the first frequency, and
the first vector includes a second acoustic pressure value associated with the second microphone at the first frequency.

11. The computer-implemented method of claim 5, further comprising:
- generating a first acoustic pressure vector including at least a first acoustic pressure value associated with the first microphone at a first frequency and a second acoustic pressure value associated with the second microphone at the first frequency;
- generating a second acoustic pressure vector including at least a third acoustic pressure value associated with the first microphone at a second frequency and a fourth acoustic pressure value associated with the second microphone at the second frequency;
- generating first data including the first acoustic pressure vector and the second acoustic pressure vector;
- performing an inverse Fast Fourier Transform on the first data to generate second data;
- generating third data by padding the second data with zeros;
- performing a Fast Fourier Transform on the third data to generate fourth data; and
- determining, based on the fourth data, at least the first filter coefficient value and the second filter coefficient value.

12. The computer-implemented method of claim 5, further comprising:
- receiving the first audio data, wherein the first audio data includes (i) a first representation of speech, (ii) a second representation of the first acoustic noise, and (iii) a first representation of second acoustic noise generated by a noise source;
- receiving the second audio data, wherein the second audio data includes (i) a second representation of the speech, (ii) a third representation of the first acoustic noise, and (iii) a second representation of the second acoustic noise;
- generating the third audio data, wherein the third audio data includes the first representation of the first acoustic noise;
- generating, based on the first audio data and the third audio data, the fourth audio data, wherein the fourth audio data includes a third representation of the speech and a third representation of the second acoustic noise; and
- generating, based on the second audio data and the third audio data, the fifth audio data, wherein the fifth audio data includes a fourth representation of the speech and a fourth representation of the second acoustic noise.

13. A system comprising:
- at least one processor; and
- memory including instructions operable to be executed by the at least one processor to cause the system to:
  - receive first audio data associated with a first microphone;
  - receive second audio data associated with a second microphone;
  - determine a first filter coefficient value corresponding to at least one loudspeaker, the first filter coefficient value associated with the first microphone;
  - determine a second filter coefficient value corresponding to the at least one loudspeaker, the second filter coefficient value associated with the second microphone;
  - generate a first portion of third audio data based on the first audio data and the first filter coefficient value, the third audio data including a first representation of first acoustic noise generated by the at least one loudspeaker;
  - generate a second portion of the third audio data based on the second audio data and the second filter coefficient value;
  - generate fourth audio data by subtracting at least a portion of the third audio data from the first audio data; and
  - generate fifth audio data by subtracting at least a portion of the third audio data from the second audio data.

14. The system of claim 13, wherein the memory further comprises instructions that, when executed by the at least one processor, further cause the system to:
- determine, using one or more beamformers based on the fourth audio data and the fifth audio data, a plurality of audio signals comprising:
  - a first audio signal corresponding to a first direction, and
  - a second audio signal corresponding to a second direction;
- determine that the first audio signal includes a first representation of speech;
- determine that the second audio signal includes a first representation of second acoustic noise generated by a noise source; and
- generate sixth audio data by subtracting at least a portion of the second audio signal from the first audio signal, the sixth audio data including a second representation of the speech.

15. The system of claim 13, wherein the memory further comprises instructions that, when executed by the at least one processor, further cause the system to:
- determine a first plurality of coefficient values associated with a first direction, wherein the first plurality of coefficient values correspond to a first linear filter used by one or more beamformers, the first plurality of coefficient values including a first coefficient value corresponding to the first microphone and a second coefficient value corresponding to the second microphone;
- generate a first portion of a first audio signal by multiplying the fourth audio data by the first coefficient value;
- generate a second portion of the first audio signal by multiplying the fifth audio data by the second coefficient value;
- determine a second plurality of coefficient values associated with a second direction, wherein the second plurality of coefficient values correspond to a second linear filter used by the one or more beamformers, the second plurality of coefficient values including a third coefficient value corresponding to the first microphone and a fourth coefficient value corresponding to the second microphone;
- generate a first portion of a second audio signal by multiplying the fourth audio data by the third coefficient value; and
- generate a second portion of the second audio signal by multiplying the fifth audio data by the second coefficient value.

16. The system of claim 13, wherein the memory further comprises instructions that, when executed by the at least one processor, further cause the system to:
- generate playback audio data that is synchronized with the third audio data;
- generate the fourth audio data by subtracting at least a portion of at least one of the third audio data or the playback audio data from the first audio data; and generate the fifth audio data by subtracting at least a portion of at least one of the third audio data or the playback audio data from the second audio data.

17. The system of claim 13, wherein the memory further comprises instructions that, when executed by the at least one processor, further cause the system to:
- determine that a first portion of the first audio data is received at a first time;
- determine that a first portion of the third audio data is received at a second time, the first portion of the third audio data corresponding to the first portion of the first audio data;
- determine a delay value between the first time and the second time; and
- generate the fourth audio data by subtracting at least the portion of the third audio data from the first audio data, wherein the first audio data is synchronized with the third audio data based on the delay value.

18. The system of claim 13, wherein the memory further comprises instructions that, when executed by the at least one processor, further cause the system to:
- determine an inhomogeneous Helmoholtz equation associated with a first frequency;
- solve the inhomogeneous Helmoholtz equation to generate a first vector of acoustic pressure values associated with the first frequency, wherein:
  - the first microphone is modeled as a first point receiver,
  - the second microphone is modeled as a second point receiver,
  - the first vector includes a first acoustic pressure value associated with the first microphone at the first frequency, and
  - the first vector includes a second acoustic pressure value associated with the second microphone at the first frequency.

19. The system of claim 13, wherein the memory further comprises instructions that, when executed by the at least one processor, further cause the system to:
- generate a first acoustic pressure vector including at least a first acoustic pressure value associated with the first microphone at a first frequency and a second acoustic pressure value associated with the second microphone at the first frequency;
- generate a second acoustic pressure vector including at least a third acoustic pressure value associated with the first microphone at a second frequency and a fourth acoustic pressure value associated with the second microphone at the second frequency;
- generate first data including the first acoustic pressure vector and the second acoustic pressure vector;
- perform an inverse Fast Fourier Transform on the first data to generate second data;
- generate third data by padding the second data with zeros;
- perform a Fast Fourier Transform on the third data to generate fourth data; and
- determine, based on the fourth data, at least the first filter coefficient value and the second filter coefficient value.

20. The system of claim 13, wherein the memory further comprises instructions that, when executed by the at least one processor, further cause the system to:
- receive the first audio data, wherein the first audio data includes (i) a first representation of speech, (ii) a second representation of the first acoustic noise, and (iii) a first representation of second acoustic noise generated by a noise source;
- receive the second audio data, wherein the second audio data includes (i) a second representation of the speech, (ii) a third representation of the first acoustic noise, and (iii) a second representation of the second acoustic noise;
- generate the third audio data, wherein the third audio data includes the first representation of the first acoustic noise;
- generate, based on the first audio data and the third audio data, the fourth audio data, wherein the fourth audio data includes a third representation of the speech and a third representation of the second acoustic noise; and
- generate, based on the second audio data and the third audio data, the fifth audio data, wherein the fifth audio data includes a fourth representation of the speech and a fourth representation of the second acoustic noise.

* * * * *